Oct. 6, 1964  J. J. BRAND  3,151,794
GLASS-SCORING AND BREAKING APPARATUS
Filed Feb. 26, 1960  10 Sheets-Sheet 1
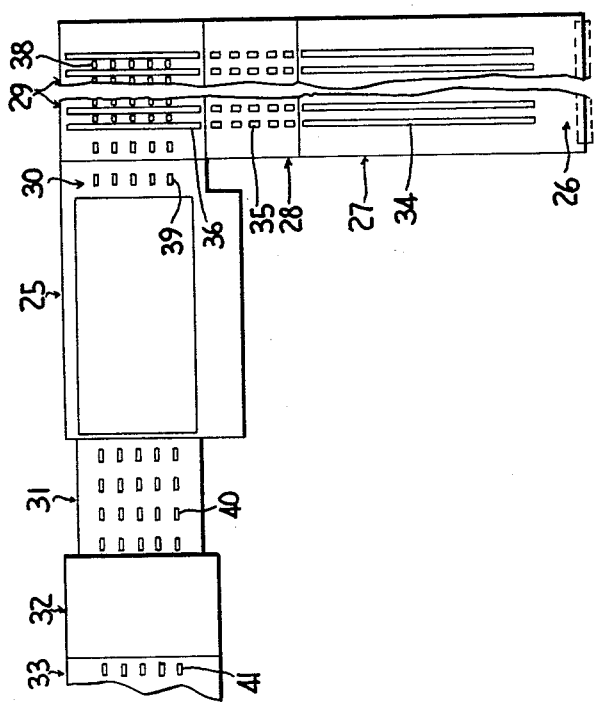
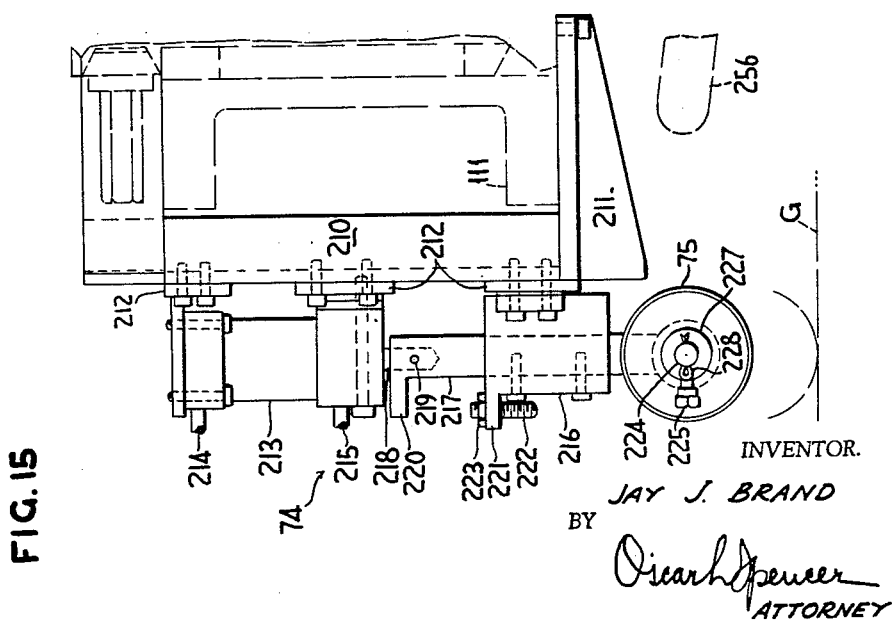
INVENTOR.
JAY J. BRAND
BY
Oscar L. Spencer
ATTORNEY

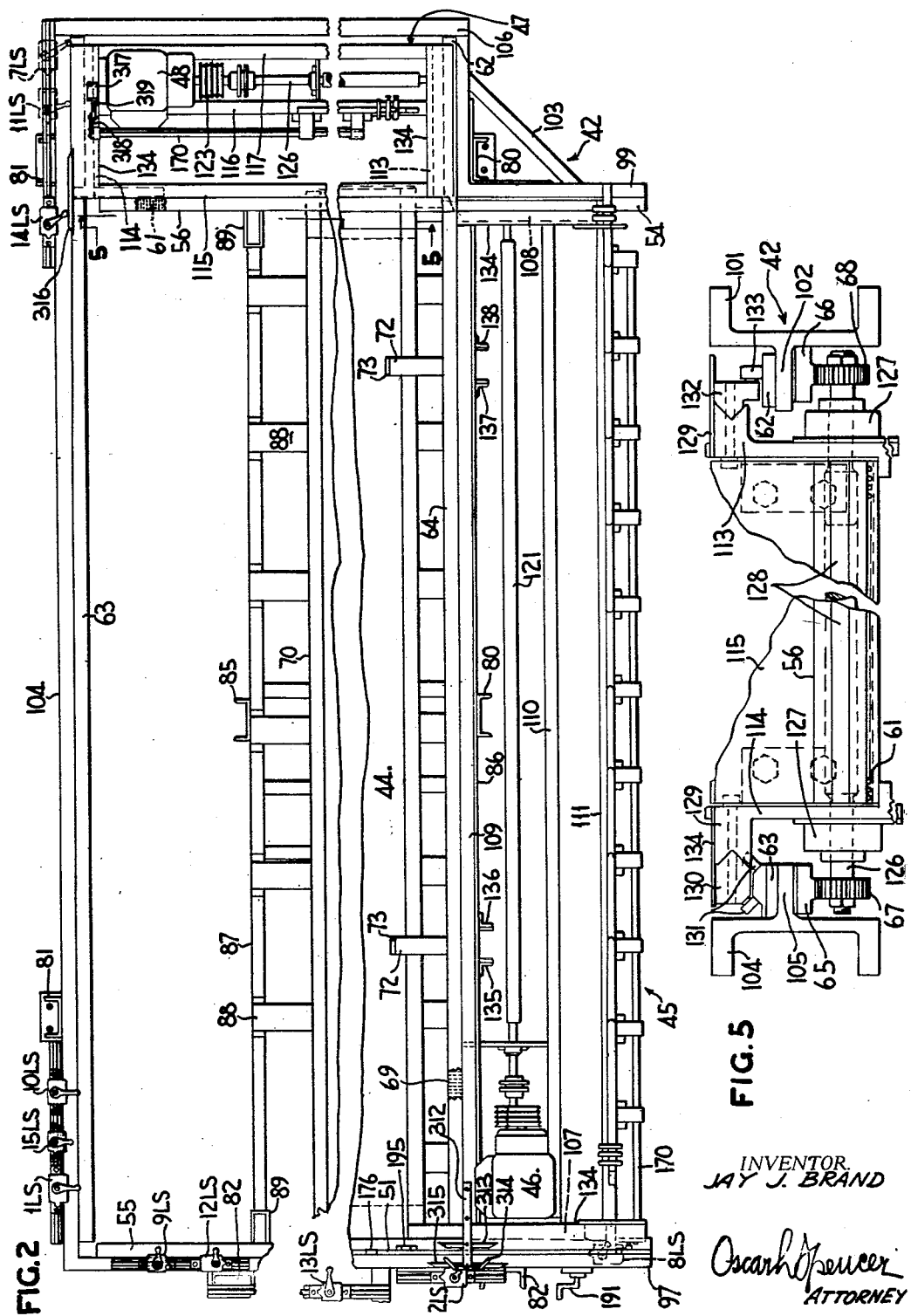

Oct. 6, 1964
J. J. BRAND
3,151,794
GLASS-SCORING AND BREAKING APPARATUS
Filed Feb. 26, 1960
10 Sheets-Sheet 3
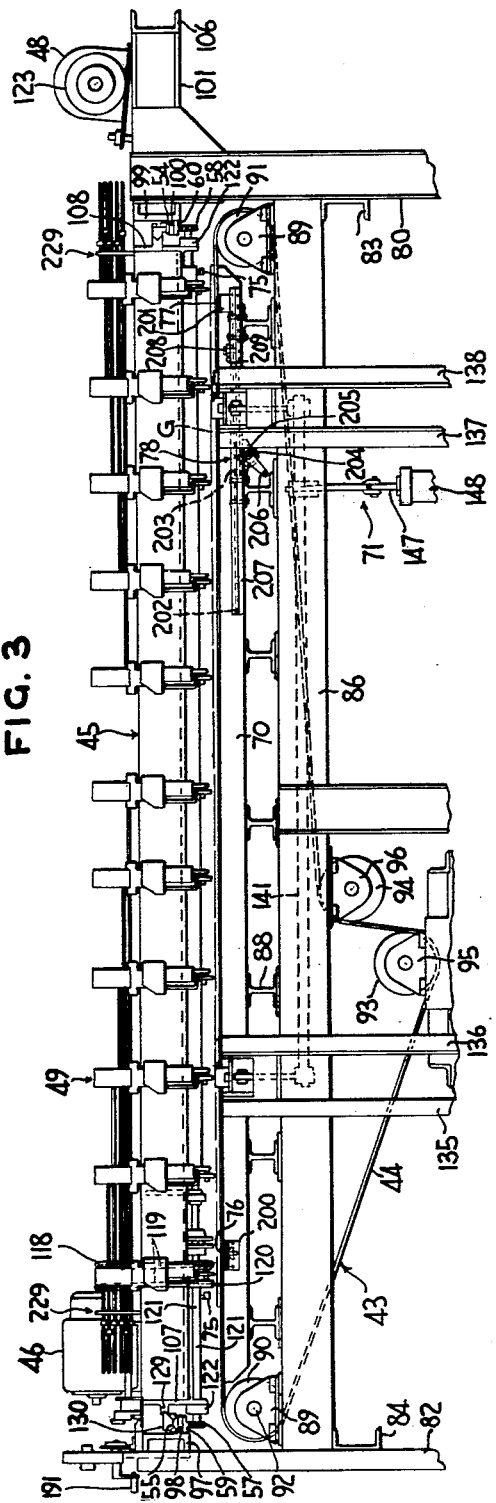
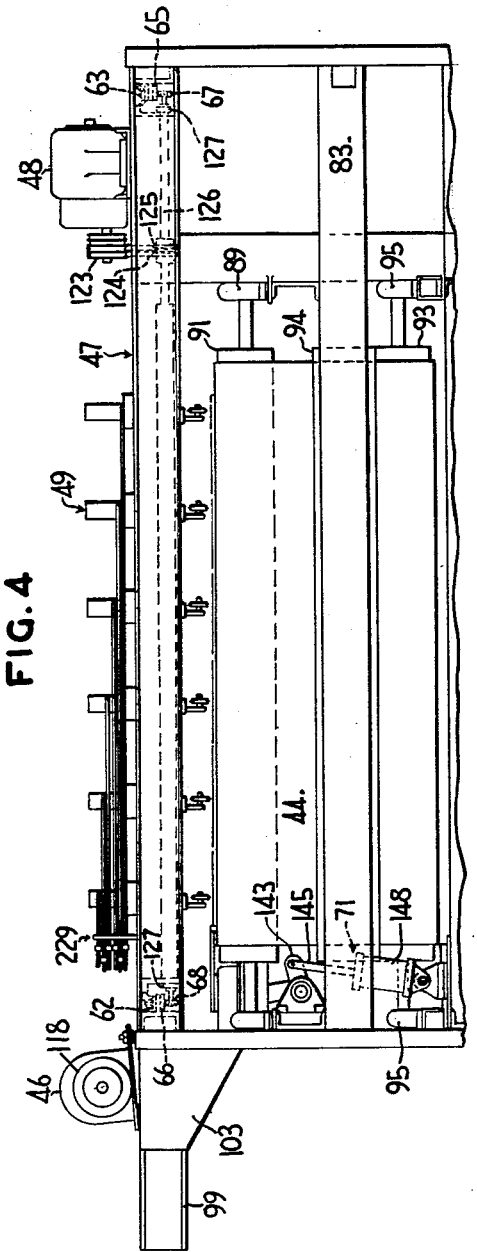
INVENTOR.
JAY J. BRAND
BY
Oscar H Spencer
ATTORNEY Oct. 6, 1964  J. J. BRAND  3,151,794
GLASS-SCORING AND BREAKING APPARATUS
Filed Feb. 26, 1960  10 Sheets-Sheet 4
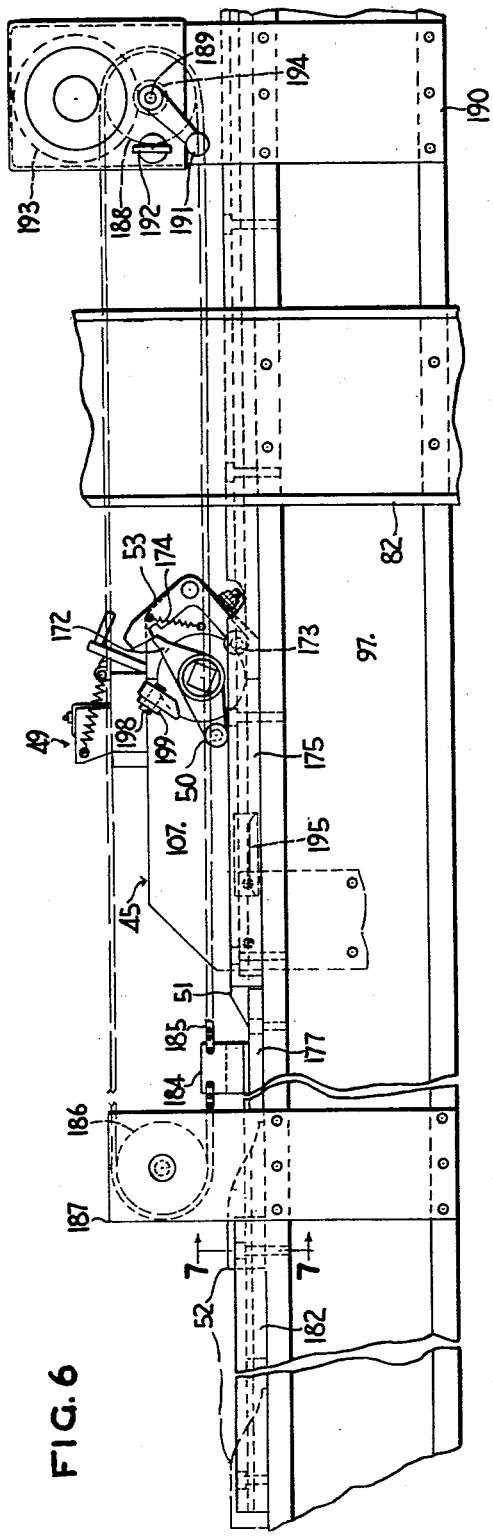
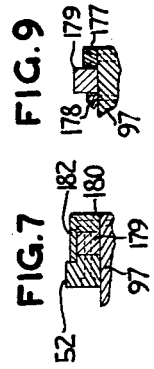
FIG. 7  FIG. 9
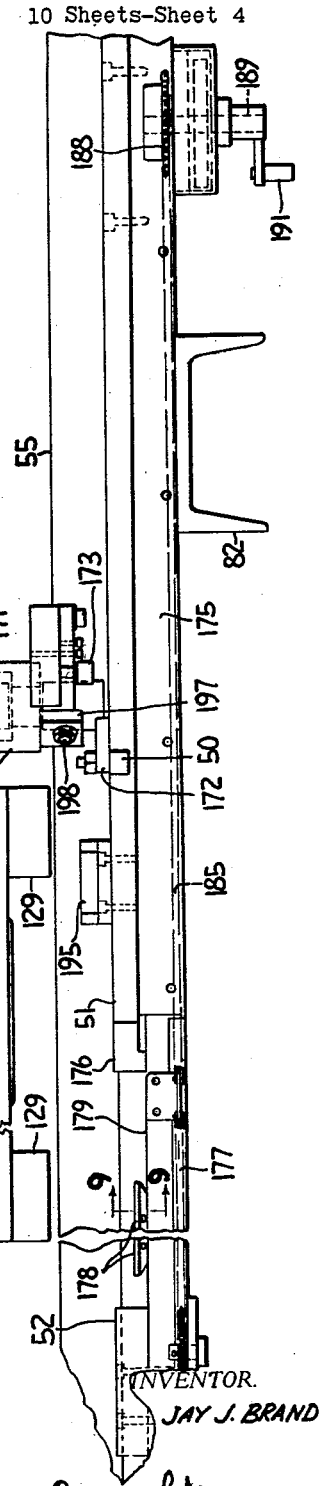
INVENTOR.
JAY J. BRAND
BY
Oscar H. Spencer
ATTORNEY Oct. 6, 1964  J. J. BRAND  3,151,794
GLASS-SCORING AND BREAKING APPARATUS
Filed Feb. 26, 1960  10 Sheets-Sheet 5
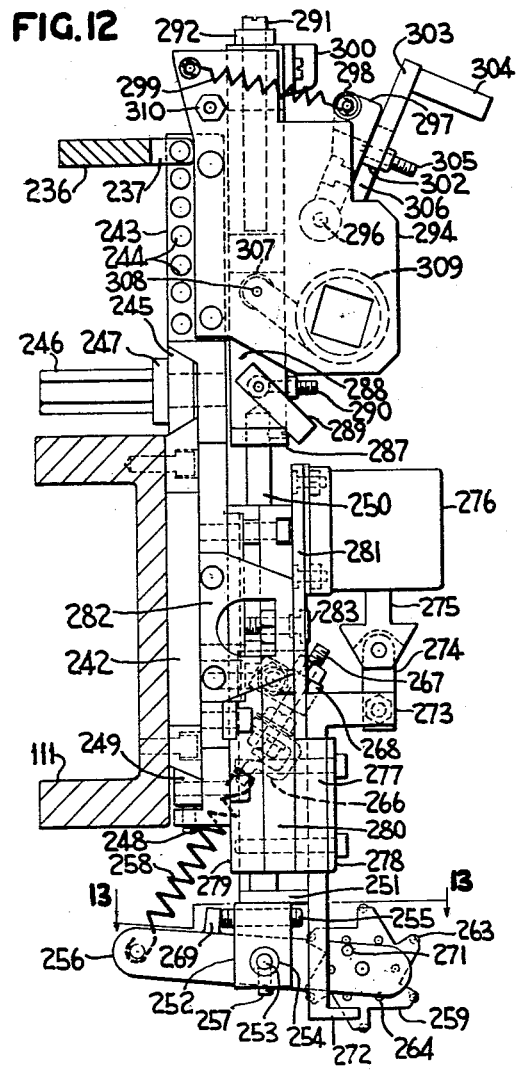
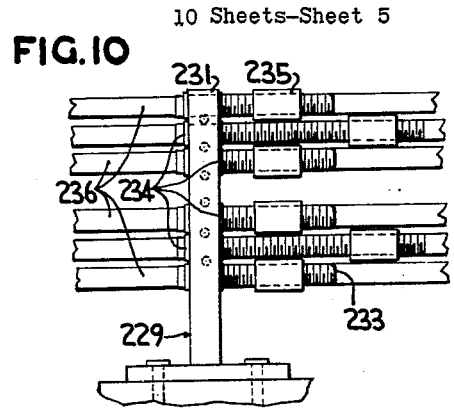
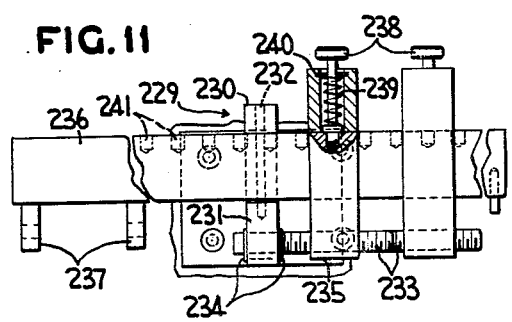
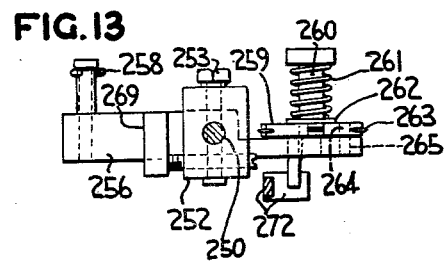
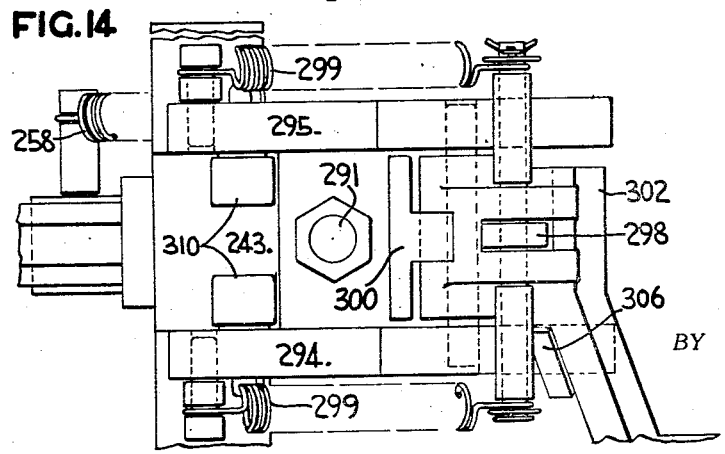
INVENTOR.
JAY J. BRAND
BY
Oscar L. Spencer
ATTORNEY Oct. 6, 1964  J. J. BRAND  3,151,794
GLASS-SCORING AND BREAKING APPARATUS
Filed Feb. 26, 1960  10 Sheets-Sheet 6

INVENTOR.
JAY J. BRAND
BY
Oscar L. Spencer
ATTORNEY

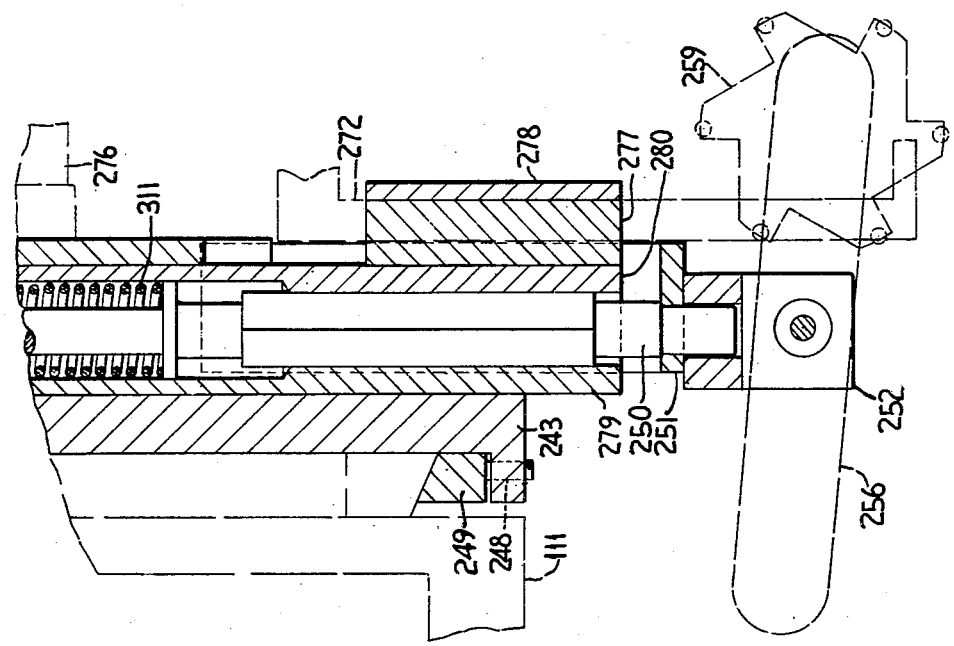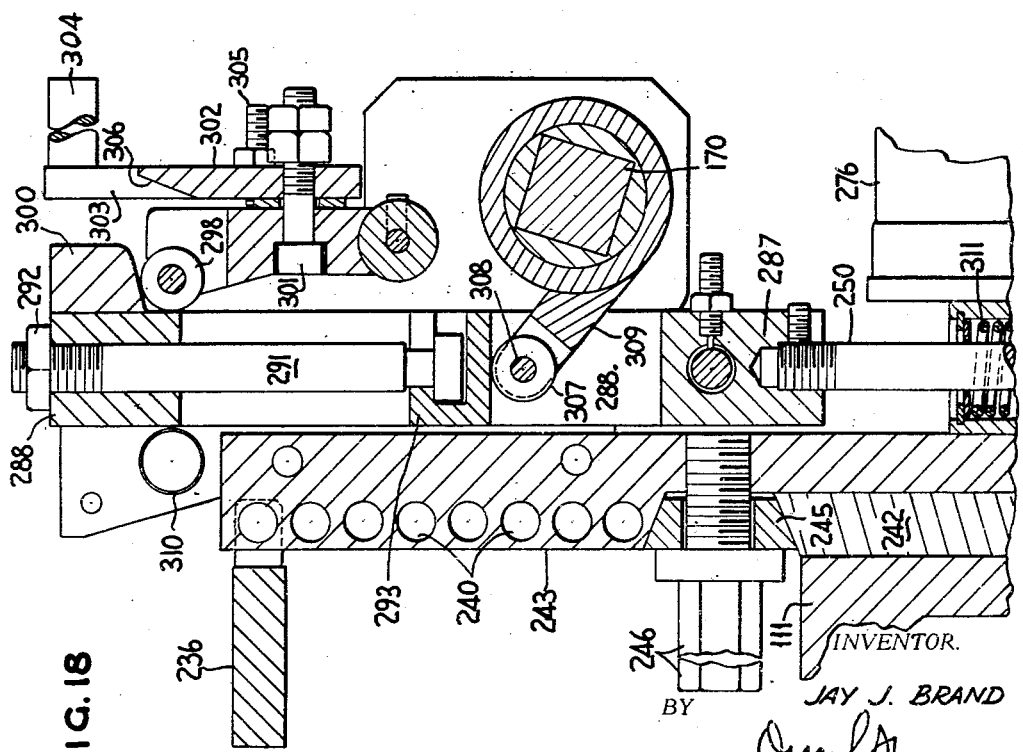

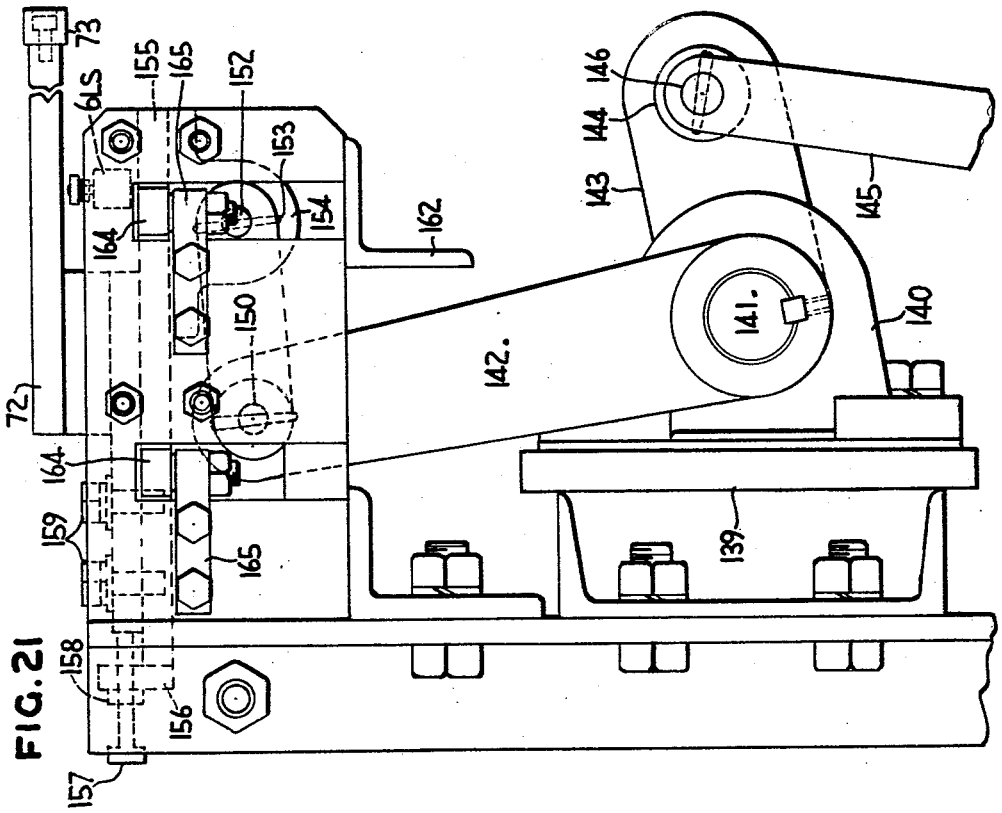
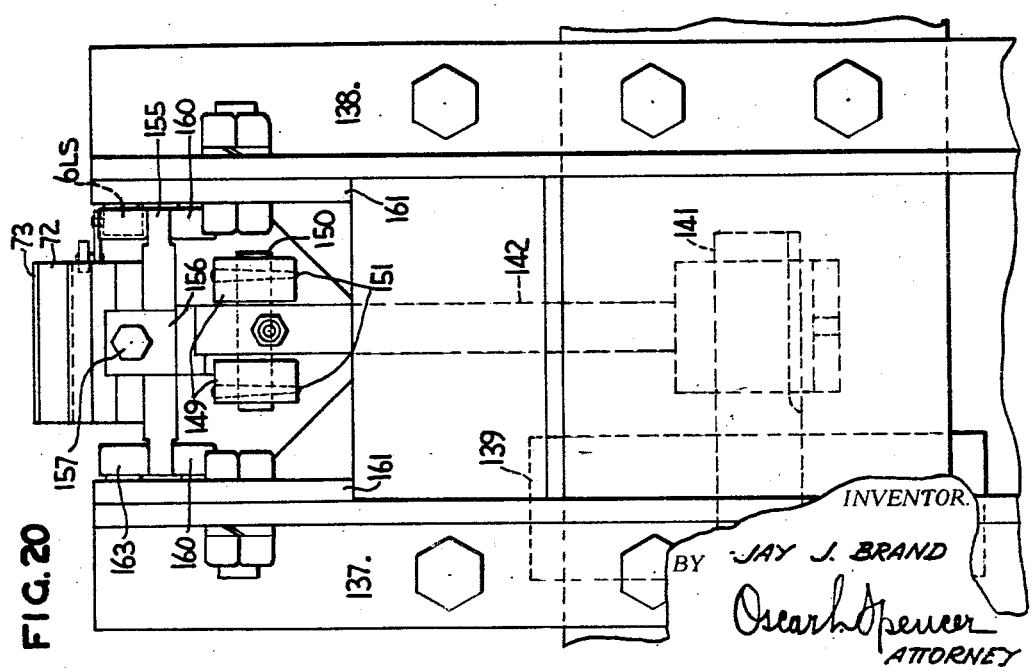

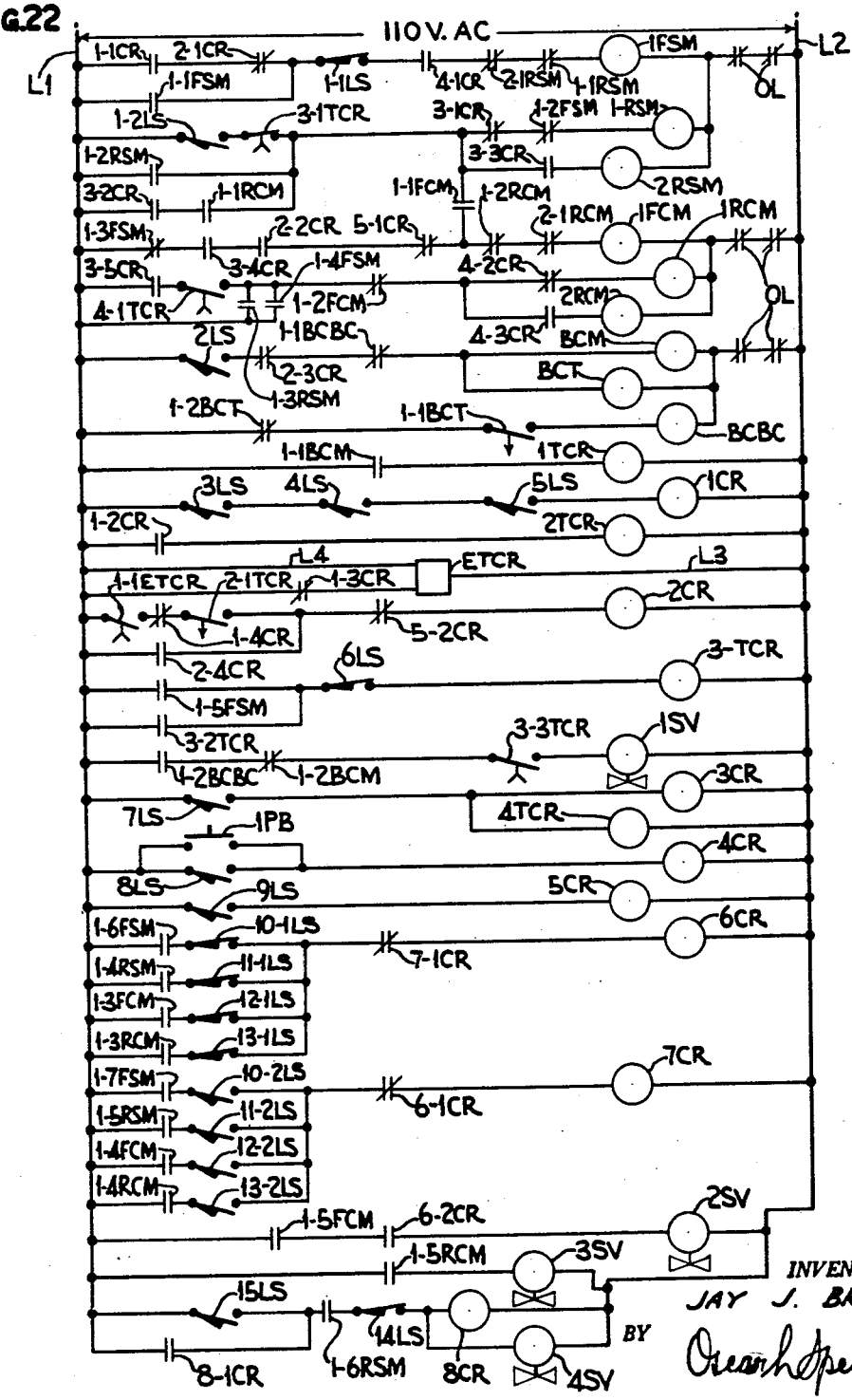

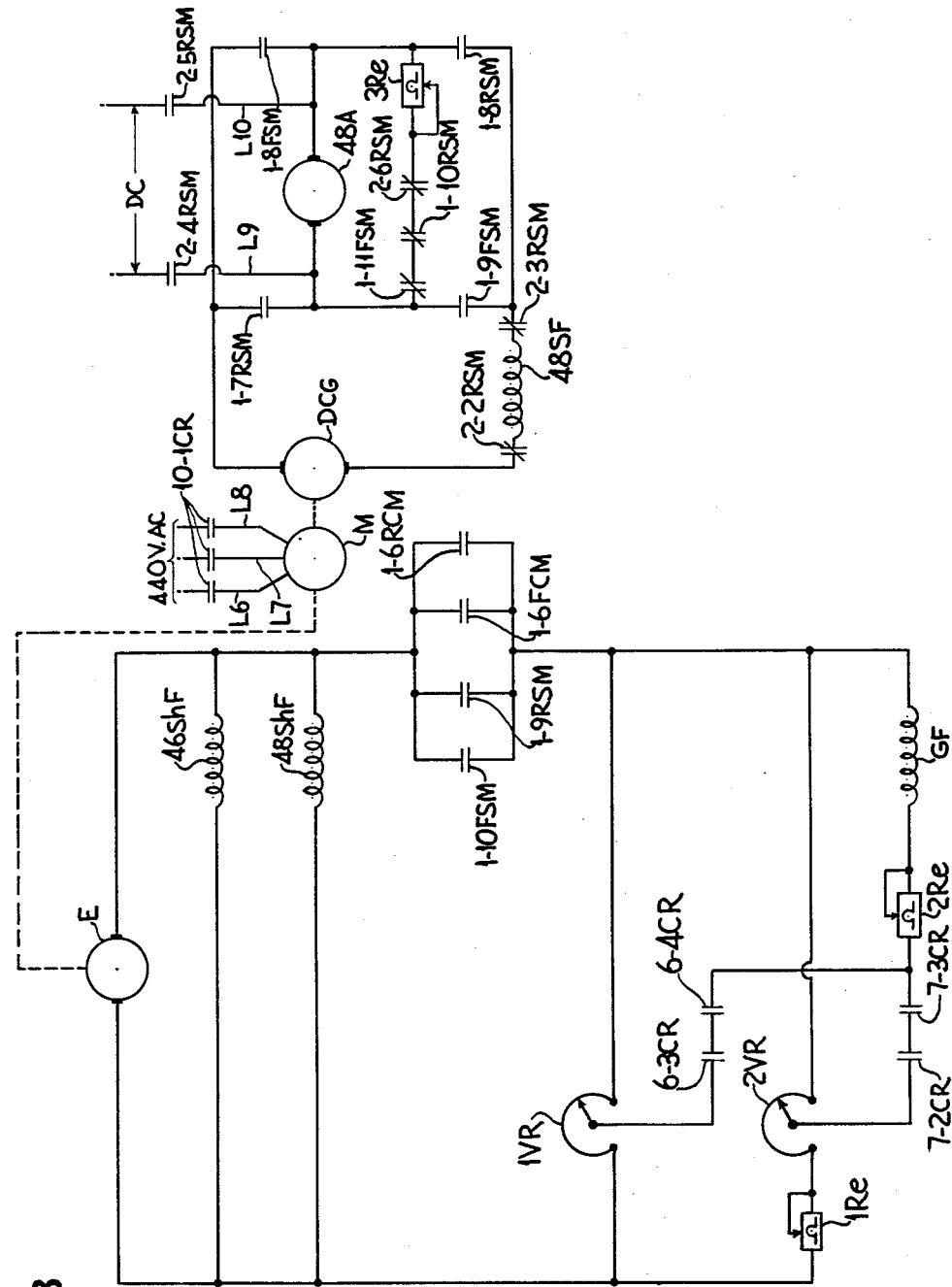

United States Patent Office 3,151,794
Patented Oct. 6, 1964

3,151,794
GLASS-SCORING AND BREAKING APPARATUS
Jay J. Brand, Whitehall Borough, Pa., assignor to Pittsburgh Plate Glass Company, Allegheny County, Pa., a corporation of Pennsylvania
Filed Feb. 26, 1960, Ser. No. 11,261
18 Claims. (Cl. 225—96.5)

This invention relates to a glass cutting apparatus and more specifically relates to an apparatus for cutting or merely scoring a glass sheet along a set of parallel lines and along another set of parallel lines which are normal to the first set of parallel lines.

In the apparatus of the present invention a glass sheet is moved by a conveyor to a cutting station where the glass sheet is first preferably moved laterally, with respect to its original path of movement provided by the conveyor, by a pair of pusher members to insure that the abutted edge of the glass sheet is properly indexed in alignment with the original path of travel afforded by the conveyor means. The apparatus further includes at the cutting station a pair of movable bridges that move in horizontal directions normal to each other and which support cutter assemblies having cutter wheels so that the glass sheet is provided with at least two sets of score lines. In each set score lines are parallel and one set is normal to the other set.

It is an object of the present invention to provide an apparatus for making two sets of parallel score lines on a glass sheet at a cutting station in which the sets of score lines are normal to each other.

It is a further object of this invention to provide an apparatus for making on a glass sheet two sets of parallel score lines in which the entire scoring or cutting operation is carried out completely automatically in a programmed sequence of operation.

It is still a further object of this invention to provide an apparatus occupying a relatively small amount of floor and having a pair of movable bridges supporting cutter assemblies for making two sets of parallel score lines on a stationary glass sheet in which the sets are normal to each other.

These and other objects of this invention will be apparent to one skilled in the art from the description which follows of a preferred embodiment of the apparatus taken along with the drawings in which similar parts are generally designated by the same numeral and in which:

FIG. 1 is a plan showing the general arrangement of the apparatus of the present invention in its relationship with conveyors for feeding glass sheets to the apparatus, and conveyors and apparatus for receiving and snapping the scored glass sheet to run the cuts along the score lines which are normal to the direction of travel of the sheet through the cutting apparatus;

FIG. 2 is a plan of the cutting apparatus with parts removed;

FIG. 3 is a front elevation of the cutting apparatus;

FIG. 4 is a side elevation of the cutting apparatus;

FIG. 5 is a fragmentary cross section of the apparatus taken along line 5—5 of FIG. 2;

FIG. 6 is a fragmentary side elevation of the apparatus taken from a side opposite that of FIG. 4 and showing one of the movable bridges of the invention partly away from its home position;

FIG. 7 is a cross section taken along the line 7—7 of FIG. 6;

FIG. 8 is a fragmentary plan showing the portion of the appaartus shown in elevation in FIG. 6;

FIG. 9 is a cross section taken along the line 9—9 of FIG. 8;

FIG. 10 is a fragmentary front elevation of one of the positioning mechanisms for indexing one of the sets of cutter assemblies at distances from one another that are multiples of a unit of length;

FIG. 11 is a plan of the positioning mechanism shown in FIG. 10;

FIG. 12 is a fragmentary cross section of one of the movable bridges of the invention showing in elevation one of the cutter assemblies;

FIG. 13 is a cross section taken along line 13—13 of FIG. 12;

FIG. 14 is a plan of the cutter assembly shown in FIG. 12;

FIG. 15 is a fragmentary side elevation of one of the movable bridges of the apparatus showing one of the two cut-running devices which are mounted near opposite ends of the movable bridge;

FIG. 18 is a vertical section taken along the line 18—18 of FIG. 16;

FIG. 19 is a vertical cross section taken along the line 19—19 of FIG. 17;

FIG. 20 is a front elevation of a part of the apparatus showing an upper portion of the squaring device of the apparatus;

FIG. 21 is a side elevation showing the upper portion of the squaring device seen in FIG. 20;

FIG. 22 is a schematic drawing of electrical circuitry used in the apparatus; and FIG. 23 is a schematic drawing of part of the electrical circuitry to operate the drive motors for the moving bridges at slow and fast speeds in forward and reverse directions.

Figure 17:
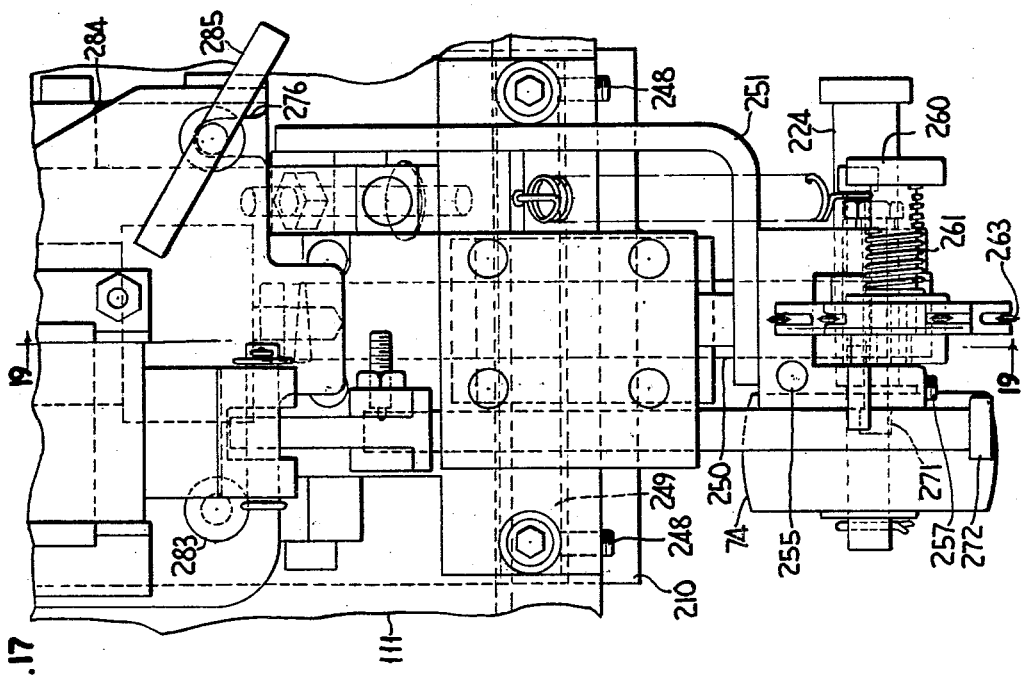
FIG. 17 is a front elevation of a lower portion of one of the cutter assemblies.

The glass cutting apparatus of the present invention is generally indicated at 25 in FIG. 1 in which it is shown in an illustrative embodiment where it is associated with other apparatus from which glass sheets are received and other apparatus to which the glass cutting apparatus of this invention feeds the scored glass sheets to be snapped along one of the sets of score lines, if such snapping is required. The associated apparatus with the glass cutting apparatus in FIG. 1 includes a glass sheet drawing apparatus generally indicated at 26 which produces an upwardly moving vertical ribbon of glass which is cut transversely to proper lengths to produce sheets known as capped sheets. Each capped sheet is laid down onto a horizontal belt conveyor means generally indicated at 27 by a laydown conveyor arm (not shown). The conveyor 27 transfers the glass sheets to a take-away conveyor generally indicated at 28 which transfers each capped glass sheet to a corner transfer table conveyor generally indicated at 29 to transfer it laterally of its original horizontal travel onto a conveyor 30 which feeds the glass sheets to glass cutting apparatus 25.

After the scoring operation on apparatus 25 the scored glass sheet is transferred to receiving conveyor generally indicated at 31 which passes the scored glass sheet through a glass snapping apparatus generally indicated at 32 which runs the cuts along the score lines normal to the path of travel of the moving glass sheet. From the snapping apparatus the glass sheet is then transferred to a take-away conveyor generally indicated at 33 from which it may be transferred to a corner transfer table where the smaller glass sheets from the snapping operation are moved in a path, parallel to the original path of travel provided by conveyors 27 and 28, so that the score lines of the smaller glass sheets can be snapped by a glass snapping apparatus. Although conventional glass snapping apparatus may be used for apparatus 32 and for the glass snapping apparatus for the other set of parallel score lines, the glass snapping apparatus of the type disclosed and claimed in copending patent application entitled "Glass Snapping Apparatus" filed on February 15, 1960, by Alfred C. Oakes, Wayne W. Oakes and Charles Hatfield, can be used.

The capped glass sheet G is conveyed in the first horizontal path of travel first by belts 34 of conveyor 27, and then by rings 35 of rubber or other resilient material on shafts (not shown) to constitute conveyor rolls of conveyor 28 onto belts 36 of corner turntable 29. By conventional means rubber or other resilient rings 38 of conveyor rolls are raised in the conventional manner of operation to move glass sheet G laterally of its previous path of travel onto conveyor 30 where its conveyor rolls having shafts with rings 39 of rubber or other resilient material mounted on them transfer sheet G to conveyor 25.

The conveyors 31 and 33 have conveyor rolls, each of which constitutes a shaft having rings 40 and 41, respectively, of rubber or other resilient material mounted on it. The snapping apparatus may have similar conveyor rolls. Of course, various conveyors may be belt conveyors as in the case of conveyor 27.

The glass cutting apparatus 25 is shown in FIG. 2 without adjacent receiving conveyor 31 at the left and conveyor 30 at the right where some conveyor rolls of conveyor 30 would appear. The cutting apparatus 25 has a supporting structure or frame generally indicated at 42. The cutting apparatus 25 has a conveyor, generally indicated at 43 (FIG. 3), which has a belt 44. The cutting apparatus 25 has a movable cutting bridge, generally indicated at 45, which is driven by a motor 46 in a direction transversely of the path of travel of the top run of belt 44 and has a movable cutter bridge, generally indicated at 47 (FIG. 4), which is driven by a motor 48 in a direction parallel to the top run of belt 44. The bridges 45 and 47 support cutter assemblies generally indicated at 49.

As described later, bridge 47 moves from right to left (as viewed in FIG. 3) from its home position and then reverses its direction to score glass sheet G by cutter assemblies 49 on bridge 47 while sheet G is stationary on belt 44. These parallel score lines are referred to as strip score lines so that bridge 47 is referred to as a strip cutting bridge. When bridge 47 returns to its home position, bridge 45 moves from right to left (as viewed in FIG. 6) so that its cutter assemblies 49 score sheet G after cutter assemblies 49 are lowered by a follower 50 riding down on cam 51 (FIG. 6). After cutter assemblies 49 on bridge 45 provide the parallel score lines, follower 50 rides up on cam 52 to permit latch arm 53 to hold assemblies 49 in their raised position during the reverse movement of bridge 45 across sheet G to its home position.

The bridge 45 is supported in its home position by a short flat rail support 54 and by a long guide rail support 55 which are mounted on supporting structure 42. The guide rail support 55 provides guiding support for bridge 45 during its entire travel. The flat rail support 54 provides the second support for bridge 45 at and adjacent its home position. When bridge 45 is away from its home position, a long flat rail support 56 mounted on bridge 47 serves as the second support during the rest of the travel of bridge 45. This occurs while bridge 47 is at its home position. The drive by motor 46 is through gears 57 and 58 which mesh with a long rack 59 and a short rack 60 mounted on supporting structure 42 while bridge 45 is at and adjacent to its home position. Rack 59 is meshed by gear 57 during the full length of travel of bridge 45 whereas rack 60 meshes with gear 58 only at and adjacent the home position of bridge 45. The gear 58 during the rest of the travel of bridge 45 meshes with a rack 61 mounted on bridge 47.

Similarly, bridge 47 is supported at and adjacent its home position by a short flat rail support 62 and a long guide rail support 63 mounted on supporting structure 42. The guide rail support 63 provides the first support for bridge 47 during the full length of travel. The bridge 45 has a flat rail support 64 mounted on it so that, at the home position of bridge 45, rail support 64 provides the second support for bridge 47 during its travel away from and towards its home position. Similarly, a long rack 65 and a short rack 66 mounted on supporting structure 42 engage gears 67 and 68 driven by motor 48 of bridge 47 when the latter is at and adjacent its home position. The rack 65 extends the full length of travel of bridge 47 whereas rack 66 does not. However, gear 68, upon leaving meshing engagement with rack 66, meshes with a long rack 69 mounted on bridge 45 for continued movement away from and then for return movement toward the home position of cutter bridge 47.

The flat rail supports 54 and 56 are at the same elevation and guide rail support 55 is preferably also at this elevation. Each of rail suports 54 and 56 is mitered at one end, as shown near the lower right-hand corner of FIG. 2, so that when bridge 47 is at its home position rail supports 54 and 56 provide in effect a continuous rail support for one end of bridge 45. Similarly, racks 60 and 61 are in the same elevation and preferably rack 59 is at this elevation. The racks 60 and 61 are mitered at one end in the manner that rail supports 54 and 56 are mitered so that when bridge 47 is at its home position racks 60 and 61 provide in effect a continuous rack.

The flat rail supports 62 and 64 are at the same elevation and preferably guide rail support 63 is at this elevation. Each of rail supports 62 and 64 is mitered at one end so that when bridge 45 is at its home position rail supports constitute in effect a continuous rail support for one end of bridge 47. The racks 66 and 69 are at the same elevation and preferably rack 65 is at this elevation. The racks 66 and 69 are each mitered at one end so that when bridge 45 is at its home position racks 66 and 69 constitute in effect a continuous rack.

The elevation for rail supports 62 and 64 is different than the elevation for rail suports 54 and 56. In the preferred embodiment the elevation for supports 62 and 64 is above the elevation of supports 54 and 56. The racks 60 and 61 are at the different elevation than are racks 66 and 69 and in the preferred embodiment shown in the drawings racks 66 and 69 are at an elevation above that of racks 60 and 61.

The top run of belt 44 is supported by a table 70. The positioning mechanism generally indicated at 71 of apparatus 25 has a pair of pusher plates 72 which are spaced from each other in the direction of travel of glass sheet G on belt 44. Each of the pusher plates 72 has a facing block 73 of micarta or other similar material bolted on its front face. The positioning mechanism 71 when operated moves pusher plates 72 and facing blocks 73 across belt 44 into engagement with glass sheet G. The amount of movement thus provided for plates 72 is sufficient to insure that both of facing blocks 73 abut glass sheet G and move it at least a small distance. Of course, this requirement involves the feeding of glass sheet G onto belt 44 in such a manner that this can be accomplished. The facing blocks 73 move sheet G to insure that this abutted edge of sheet G is properly indexed with respect to apparatus 25.

As described later, apparatus 25 includes electrical circuitry so that the trailing edge of sheet G when sationary on belt 44 is properly indexed. This is done by controlling the time at which the motor that drives belt 44 stops. The leading edge of sheet G when approaching belt 44 initiates the drive of bridge 47 from right to left (as viewed in FIG. 2) so that bridge 47 moves at high speed ahead of glass sheet G. Before bridge 47 reaches its maximum position to the left its motor 48 changes operation for slow speed drive until bridge 47 reaches its desired maximum position away from its home position. Then the drive of motor 48 ceases.

When the trailing edge of sheet G passes the position, where the leading edge was initially sensed before it reaches belt 44, the motor drive for belt 44 ceases, after a delay, for the proper indexing of sheet G. Then positioning mechanism 71 operates to move facing blocks 73 so that it pushes sheet G for proper alignment of its edge. As described later, positioning mechanism 71 then retracts pusher plates 72 and the reverse drive of motor 48 at high speed is initiated. With a predetermined number of cutter assemblies 49 in scoring position bridge 47 moves across sheet G to provide parallel score lines. After bridge 47 passes the trailing edge of sheet G, the electrical control automatically shifts the motor drive of motor 48 to slow speed until it reaches its home position where motor 48 is given a torque to maintain bridge 47 against stop members (not shown) so that bridge 47 is in its home position for alignment of rail supports 54 and 56 and for alignment of racks 60 and 61.

When bridge 47 reaches its home position, the electrical control provides automatically for motor 46 to operate at high speed to drive bridge 45 transversely across sheet G. The appropriate cutter assemblies 49 on bridge 45 are lowered during this travel to provide parallel transverse score lines on sheet G and then cutter assemblies 49 are raised to a latched position as described earlier. The bridge 45 is driven at slow speed by motor 46 until it is driven in the reverse direction at high speed.

Before the reverse drive of motor 46 for bridge 45 a pair of snapping mechanisms generally indicated at 74 is operated so that each brings down its roll 75 onto sheet G. The snapping mechanisms 74 run the cuts along the score lines closest to the leading and trailing edges of sheet G because bars 76 and 77 are mounted under belt 44 adjacent these score lines but between them. Each of bars 76 and 77 extends transversely of belt 44. One of bars 76 and 77 is adjustably mounted by a device 78 for movement of that bar in a horizontal direction normal to its longitudinal axis. The wheels 75 ride on glass sheet G closer to the leading and trailing edges than the score lines whose cuts are being run.

As bridge 45 approaches its home position motor 46 changes to slow speed and the electrical control automatically initiates the drive of conveyor 43 so that belt 44 moves the scored glass sheet G from apparatus 25. Of course, the newly formed trimmed front edge portion falls between conveyor 43 and conveyor 31 rather than being transferred to the latter. The same is true for the newly formed trimmed trailing edge portion. The bridge 45 is moved by motor 46 at slow reverse speed until it reaches its home position where it abuts stop members (not shown). The electrical control then provides a slight torque to motor 46 so that bridge 45 is held against these stop members.

The supporting structure 42 has a number of upright channel irons 80 at the front of apparatus 25, a number of upright channel irons 81 at the rear of apparatus 25 and a pair of upright channel irons 82 at one end.

As seen at the right-hand side of FIG. 3, one of upright channel irons 80 and one of upright channel irons 81 support a transverse horizontal channel iron 83. The channel irons 82 at the left-hand end of FIG. 3 support a transverse horizontal channel iron 84. An upright channel iron 85 is mounted forwardly of channel irons 81. The channel irons 80, 82, 83, 84 and 85 support a pair of horizontal channel irons 86 and 87 which are transversely spaced of each other. A number of I-beams 88 are mounted at their ends on channel irons 86 and 87. The I-beams 88 support table 70.

The conveyor belt 44 in its top run slides across the top of table 70. A pair of bearings 89 is mounted on each end of channel irons 86 and 87 and these bearings 89 rotatably mount pulleys 90 and 91 for rotation about horizontal transverse axes. A shaft 92 of pulley 90 is driven by a motor means (not shown). The bottom run of belt 44 extends around pulleys 93 and 94 mounted by bearings 95 and 96 mounted on supporting structure 42.

A horizontal long channel iron 97 is mounted on upright members 82. An integral additional flange 98 extends from the web of channel iron 97 in the direction opposite to the two flanges of the channel construction. The flange 98 extends from the web at a lower elevation than the centerline of the web, as seen in FIG. 3. A horizontal short channel iron 99 is mounted on upright channel iron 80 (at the right-hand portion of apparatus as viewed in FIG. 2). The channel iron 99 has an integral additional flange 100 positioned relative to the web of channel iron 99 so that flange 100 of channel iron 99 and flange 98 of channel iron 97 oppose each other and preferably are at the same elevation.

The upright channel iron 80 that supports channel iron 99 also supports a horizontal short channel iron 101 having an integral additional flange 102 extending from the web of channel iron 101 in a direction opposite to the flanges of the channel iron 101 that define with the web the channel construction. The flange 102 extends from the web of channel iron 101 at its centerline. The channel irons 99 and 101 are joined to each other by a bracket 103. The upright channel irons 81 support a horizontal long channel iron 104 which has a construction like that of channel iron 101 so that it has an additional flange 105 which at one end opposes flange 102 and which is preferably at the same elevation as flange 102. The channel iron 104 is connected at one end to one end of channel iron 101 by a horizontal channel iron 106.

The cutter bridge 45 has end plates 107 and 108. The plates 107 and 108 are connected by brackets (not shown) to the ends of channel irons 109, 110 and 111 of bridge 45. The channel iron 109 is constructed like channel iron 101 by having an integral additional flange on which is mounted flat rail support 64. Also mounted below this additional flange, that supports rail support 64, is rack 69 that is secured below (shown in FIG. 2 where the additional flange and rail support 64 are partially broken away).

The bridge 47 has end plates 113 and 114 which are connected to the ends of channel irons 115, 116 and 117 of bridge 47. The channel iron 115 has an additional integral flange on which is mounted rail support 56. The flange on which is mounted rail support 56 also mounts below it rack 61 (shown in FIG. 2 where the additional flange and rail support 56 are partially broken away). The construction of channel iron 115 is the same as that of channel iron 99. The additional flange of channel iron 115 is at the same elevation as the additional flange 100 of channel iron 99 so that flat rail supports 54 and 56 have their top surfaces at the same elevation as mentioned earlier.

The channel irons 109 and 110 of bridge 45 support motor 46 on a tiltable bracket. By pulley 118 mounted on the shaft of motor 46, belts 119 and pulley 120, motor 46 rotates a shaft 121 on which pulley 120 is keyed. The shaft 121 is journaled adjacent its ends by bearings 122 mounted on end plates 107 and 108. The pinion gears 57 and 58 are keyed on the ends of shaft 121. The bracket supporting motor 46 can be tilted to adjust the tension of belts 119.

The channel irons 116 and 117 of bridge 47 support motor 48 on a tiltable bracket. By pulley 123 mounted on the shaft of motor 46, belts 124 and pulley 125, motor 46 rotates a shaft 126 on which pulley 125 is keyed. The shaft 126 is journaled adjacent its ends by bearings 127 mounted on end plates 113 and 114. The pinion gears 67 and 68 are keyed on the ends of shaft 121. The bracket supporting motor 48 can be tilted to adjust the tension of belts 124.

The additional flange 128 of channel iron 115 supports rack 61 as well as rail support 56.

The end plates 107, 108, 113 and 114 have integral horizontally extending flange portions 129 at their ends. Brackets 130 are mounted on flange portions 129 of plate 107. Each of the brackets 130 rotatably supports rollers or cam followers 131 which rotate about axes approximately normal to each other. The rollers 131 ride on longitudinal bevelled top surfaces of guide rail support 55. Similarly, a pair of brackets 130 is mounted on flange portions 129 of end plate 114 and these brackets 130 also rotatably support rollers 131 that rotate also about axes inclined to each other. The rollers 131 rest on and move along the longitudinal bevelled parallel top surfaces of guide rail support 63. The brackets 132, which are mounted on flange portions 129 of end plates 108 and 113, rotatably support rollers 133 which ride along flat rail supports 54 and 56 for rollers 133 on end plate 108 of bridge 45 and flat rail supports 62 and 65 for rollers 133 mounted on end plate 113 of bridge 47. Cover plates 134 are mounted on end plates 107, 108, 113 and 114.

The supporting structure also includes angle irons 135, 136, 137 and 138. A pair of plates 139 is mounted on channel iron 86 behind angle irons 136 and 137. Each of plates 139 has mounted on it a bearing 140 rotatably mounting a horizontal shaft 141. A link 142 is keyed on each end of shaft 141. Between angle irons 136 and 137 is keyed a link 143 on shaft 141. The link 143 is connected by a bearing 144 to the bifurcated end of a yoke 145. A pin 146 extends through yoke 145. The bearing 144 is mounted on pin 146. As seen in FIG. 3, yoke 145 is connected to piston rod 147 of an air cylinder 148 pivotally mounted on supporting structure 42.

Each of the links 142 is connected to a pair of links 149 by a pin 150 which is fixed in position relative to links 149 by taper pins 151 extending through links 149 and into holes in pin 150. A bearing rotatably mounts link 143 on pin 150. The pair of links 149 connected to each of links 142 is connected at the other end to a pin 152 by taper pins 153. Each of pins 152 is rotatably mounted by a bearing 154 mounted on the underface of a guide plate 155. The plate 155 has an upwardly extending tab portion 156 at its other end. The tab portion 156 has a threaded horizontal hole in which a screw 157 is fixed by a nut 158. Each pusher plate 72 has an offset lower portion which is bolted on guide plate 155 by screws 159 which extend through a slot in the lower offset portion of plate 72. When pusher plate 72 is properly positioned with respect to guide plate 155, screws 159 are tightened. The movement of plate 72 to the left (as viewed in FIG. 21), when facing blocks 73 are abutting glass sheet G in a pushing action, is prevented by screw 157.

The guide plate 155 is supported by cam followers 160 mounted on plates 161 which are supported by horizontal angle irons mounted on angle irons 135 and 136 for one of guide plates 155 and on angle irons 137 and 138 for the other of guide plates 155. The guide plates 161 are also supported by a horizontal angle iron 162 of supporting structure 42. Also mounted on plates 161 are cam followers 163 which prevent upward movement of guide plates 155. Lateral movement of guide plates 155 is prevented by cam followers 164 mounted on brackets 165 bolted to plates 161. With this construction is seen that, when piston rod 147 of air cylinder 148 is retracted pusher plates 72 are moved from left to right (as viewed in FIG. 21).

Referring to FIGS. 6 and 8, the end plate 107 of bridge 45 has integral bottom tabs 166, 167 and 168 on which channel irons 109 through 111 rest. A support plate 169 is mounted on end plate 107 and it extends through a slot in channel iron 111. A square shaft 170 extends through plate 169 and is supported by a bearing 171. An actuating arm 172 is mounted on this end of shaft 170 and supports cam follower 50. The latch arm 53 is pivotally mounted on plate 169 and has a notched portion for receiving one end of arm 172. The latch arm 53 has a cam follower 173 at one end. Its other end, which has the notch, is biased downwardly by a spring 174 connected to this end of arm 53 and to plate 169.

A guide plate 175 is mounted on channel iron 97. The cam 51 is bolted to plate 175. The left-hand end (as viewed in FIGS. 6 and 8) of cam 51 has a downwardly inclined top surface portion 176. To the left of plate 175 is mounted on channel iron 97 a guide bar 177 and a guide 178 between which slides a bar 179. The bar 179 at its one end also slides under the top flanged portion of guide plate 175. To the left of guide bar 177 is mounted a guide bar 180 on channel iron 97 and to the left of guide 178 is mounted another guide bar 181. A hold-down plate 182 is bolted on guide bar 180. The bar 179 slides between guide bars 180 and 181 and below hold-down bar 182.

The cutter raising cam 52 is bolted to bar 179 near its left-hand end. The position of cam 52 can be changed from its position shown in full lines in FIG. 6 to its extreme position to the left as shown in phantom by movement of bar 179 from left to right in the following manner. A bracket 184 is mounted on bar 179 at its right-hand end. The two ends of a chain 185 are connected to bracket 184. The chain 185 extends around a sprocket journaled on plate 187 mounted on channel iron 97. The chain 185 also extends around a sprocket 188 keyed on a shaft 189 which is journaled in a support plate 190 mounted on channel iron 97. A crank handle 191 is keyed on shaft 189. A pin having a handle 192 is biased by a spring (not shown) so that the other end of the pin is between adjacent teeth of sprocket 188.

To rotate sprocket 188 an operator pulls on handle 192 to remove the pin having handle 192 from between adjacent sprocket teeth and rotates handle 191. This moves bar 179 to left or right, depending upon the rotation of shaft 189. The position of raising cam 52 is indicated by markings on plate 190 and a pointer (not shown) mounted on a shaft journaled on plate 190 and on which a gear 193 is keyed. The gear 193 meshes with a gear 194 keyed on shaft 189.

When bridge 45 is driven from left to right (as viewed in FIGS. 6 and 8) toward its home position, arm 172 is in the notch in arm 53 so that follower 50 is above the plane of the top surface of cam 51 until follower 173 rides up on a cam 195 bolted by a bracket to channel iron 97. The cam 195 has inclined leading and trailing top surfaces. The cam 195 lifts cam follower 173 sufficiently high to pivot latch arm 53 away from actuating arm 172. The arm 172 pivots until follower 50 is lowered onto cam 51 where arm 172 is at the position indicated in FIG. 6.

When bridge 45 moves away from its home position to pass over sheet G for scoring, follower 50 rides down the inclined surface 176 of cam 51 to lower the cutters into the scoring position. After passing sheet G follower 50 rides up cam 183 to pivot arm 172 against the cam surface of latch arm 53. The arm 53 is pivoted clockwise (as viewed in FIG. 6) until the end of arm 172 moves into the recess in arm 53. The cutter assemblies 49 are now latched in their raised position.

The bearing 171 is mounted on plate 169 by bracket 196 which has a flange 197 in which is threaded a stop screw 198 fixed in position by a nut 199. The stop screw 198 limits the counterclockwise pivotal movement of actuating arm 172.

The snapping bars 76 and 77 have been referred to previously as bars that extend under belt 44 with one of bars 76 and 77 adjustably mounted by device 78 whereas the other bar is fixed in position. In FIG. 3 bar 76 is fixed in position by brackets 200 mounted on the longitudinal downwardly extending flanges of table 70. The ends of bar 77 are connected to brackets 201 of device 78. Each of brackets 201 is connected to a bar 202 which is mounted on a rack 203 (not shown) that engages a gear 204 keyed on a shaft 205 rotated by a handle 206. The shaft 205 extends under table 70 and is supported by bearings (not shown) mounted on table 70. The bars 202 are supported by and move within a guide 207. Each of bars 202 has a threaded aperture for receiving a screw 208 on which is threaded a nut 209. Below nut 209 is a small plate that abuts the top of guide 207. The nuts 209 are loosened for adjustment of bar 77. The handle 206 is turned until bar 77 is properly positioned to be adjacent the expected last score line on sheet G but between that score line and the next score line. The nut 209 is tightened to fix guide bar 202 in position.

Referring to FIG. 15, the channel iron 111 of movable bridge 45 supports a bracket 210. The bracket 210 has a bottom gusset 211. Two of plates 212 are mounted on bracket 210 and support an air cylinder 213. Hoses 214 and 215 communicate with the upper and lower chambers, respectively, of air cylinder 213. The other plate 212 supports a guide 216 through which slides a plunger plate 217 for vertical movement. The piston rod 218 extends into a top recess of plunger plate 217 and is secured to it by a taper pin 219. The top end of plunger plate 217 has a flange 220. The top of guide 216 has a flange 221 below flange 220 of plunger plate 217. A stud 222 is threaded in flange 221 and is adjustably fixed in position by a nut 223. The stud 222 limits the lowering movement of plunger plate 217 by air cylinder 213.

A pin 224 extends through the bottom portion of plunger plate 217 and is fixed in position by a screw 225. The bearing-containing wheel 75 is journaled on pin 224 between a pair of washers 227, one of which rests against the shoulder of pin 224. The wheel 75 is held on pin 224 by a cotter pin 228. The wheel is shown in full lines in FIG. 15 in its raised position and in phantom its lowered position is shown when it is on glass sheet G during the return travel of bridge 45.

In FIG. 3 the two wheels 75 are shown spaced above glass sheet G at its ends. Only the bottom portion of each of wheels 75 is shown. The wheels 75 are positioned between the end cutters and the adjacent edges of sheet G. The centerlines of plunger plates 217 are in the vertical transverse planes of the cutters of the end assemblies 49.

As seen at the top left- and right-hand ends of FIG. 3, a pair of mounting brackets generally indicated at 229 is mounted on channel iron 111 of bridge 45. A similar mounting bracket 229 is on channel iron 116 of bridge 47. As seen in FIG. 11, the mounting bracket 229 has spaced upwardly extending arms 230 and 231. Horizontal apertures extend through arm 230 and are in alignment with horizontal recesses in arm 231 to provide supports for horizontal pins 232 in vertical alignment. The arm 231 has apertures normal to the recesses in arm 231 and these support studs 233 which are fixed in position by snap rings 234 on each side of arm 231. The rings 234 are snapped into peripheral grooves in studs 233. Adjusting blocks 235 are threaded on studs 233. Because of the thickness of adjusting blocks 235, they are in a vertical staggered relationship to one another, as seen in FIG. 10. Each of adjusting blocks 235 has a square aperture through which extends an adjusting bar 236. Each of adjusting bars 236 is supported also by one of pins 232. At the other end each of bars 236 has a pair of ears 237.

Each of the adjusting blocks 235 has a hole normal to and communicating with its square aperture that receives adjusting bar 236. In this hole is a plunger 238 which is biased inwardly by a compression spring 239. The spring is held in the hole by a snap ring 240 in a circular groove adjacent the entrance to the hole. The other end of spring 239 abuts a shoulder of plunger 238. The one end of plunger 238 is thus biased into the square aperture through which passes bar 236. This end of plunger 238 extends into one of a number of recesses 241. The distance between adjacent recesses 241 is a unit of length. The glass sheets are cut to dimensions which are multiples of this unit of length.

Each of the bars 236 is adjusted to reposition an associated cutter assembly 49 by moving bar 236 from left to right (as viewed in FIGS. 10 or 11) after first pulling out plunger 238 from one of recesses 241. When the next desired position of bar 236 is attained, plunger 238 is allowed to return to its spring-biased position in opposing recess 241. Bars 236 are of different lengths for each set.

Figure 16:
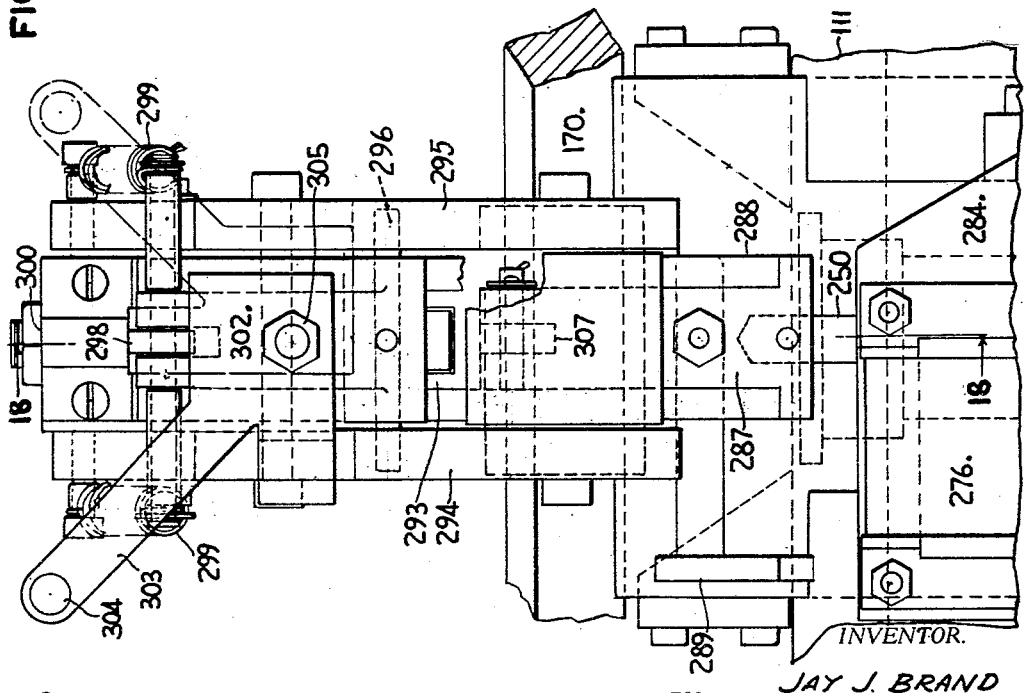
FIG. 16 is a front elevation of the upper portion of one of the cutter assemblies.

Mounted on the web of channel iron 111 of bridge 45 is a plate 242 that extends substantially the entire length of channel iron 111. Each of cutter assemblies 49 has a back plate 243. Reference is made to FIGS. 12–19 which show the construction of an end one of cutter assemblies 49 in its association with one of wheels 75 and bridge 45. Of course, the cutter assemblies for bridge 47 are similarly constructed in this preferred embodiment. The plate 243 has at its top portion a number of apertures 244 that are in a vertical row. The ears 237 of one of bars 236 abut plate 243 and apertures in ears 237 are in alignment with one of apertures 244. A nut and bolt (not shown) through these apertures are used to connect ears 237 to plate 243.

The lower portion of back plate 243 has a recessed portion which abuts plate 242. The top edge of plate 242 and the opposing top horizontal edge of the recessed portion of back plate 243 are inclined with respect to each other to receive a wedge 245 between these surfaces. The wedge 245 has an aperture through which extends a bolt 246 which is threaded into plate 243. The bolt 246 has a shoulder 247 which moves wedge 245 toward the inclined surfaces so that, when bolt 246 is tightened, wedge 245 is held tight against plate 242 and back plate 243.

The recess in plate 243 results in a bottom flange having vertical threaded apertures in which are placed screws 248. A stop or gib 249 is placed between screws 248 and the bottom edge of plate 242 which is inclined as is the top surface of gib 249. The gib 249 is bolted to back plate 243. Thus gib 249, which prevents any tilting action of cutter assembly 49, insures vertical alignment of the latter.

Each of the cutter assemblies 49 has a plunger 250. The bottom end of plunger 250 is welded to a spring clamp support 251. A cutter arm yoke 252 is welded to clamp support 251. Through the bifurcated arms of yoke 252 extends a pin 253 which is journaled in bearings 254 in yoke 252. A stop screw 255 is threaded horizontally in the top portion of yoke 252.

A cutter holder arm 256 is fixed on pin 253 by a set screw 257. The arm 256 extends between the bifurcated arms of yoke 252. A spring 258 is connected to one end of arm 256. A turret cutter holder 259 is mounted on the other end of arm 256 by a pin 260 which is threaded at one end in arm 256. Between the knob of pin 260 and turret holder 259 is a spring 261 that abuts the knob and a washer 262.

The turret holder 259 has a number of peripheral grooves in which are mounted glass cutter wheels 263 in a conventional manner with spring clips (not shown). The turret holder 259 has a number of apertures 264 which are arranged in a circle about the axis of pin 260. A pin 265 is mounted on cutter arm 256 in a position so that it extends into one of apertures 264. Thus an operator can easily move turret holder 259 away from arm 256 to permit rotation of cutter heads 263 and then when turret holder 259 is released spring 261 will force it against arm 256. Of course, this is done when another one of apertures 264 is in alignment with pin 265. This positions a different cutter wheel 263 to score the glass sheet when cutter assembly 49 is lowered onto sheet G.

The spring 258 is connected at its other end to a clamp support 266 connected by a bolt 267 to a spring adjuster block 268 bolted to the top end of spring clamp support 251 at its top end. Thus spring adjuster block 268 moves up and down with plunger 250. The spring 258 biases turret cutter 259 downwardly. This downward force is limited by a tab 269 on arm 256 abutting limit screw 255 mounted in yoke 252.

In addition to pin 265, the one end of arm 256 has a pin 271 extending from the opposite vertical face of arm 256. A lifting bar 272 has at its top end a bifurcated horizontal flange 273 which is joined by a connecting bar 274 to a shaft 275 of a solenoid 276.

The lifting bar 272 has its main vertical portion sliding between a guide 277 and a guide cover plate 278 which are bolted to a housing member 279 through a housing member 280. The housing members 279 and 280 enclose the central portion of plunger 250 and provide a vertical aperture which corresponds in cross section to the central portion of plunger 250 which has four vertical ribs equally spaced from one another. The housing member 280 is also bolted to housing member 279 which is bolted to plate 243.

The solenoid 276 is mounted on a plate 281. A clamp block 282 (FIG. 12) pivotally supports plate 281 by a bolt 283. The clamp block 282 is mounted on one vertical side of plate 243. A clamp block 284 (FIG. 17) is bolted on the other vertical edge of plate 243. A wing bolt 285 extends through a notch 286 in plate 281 and into block 284. The wing bolt 285 holds plate 281 against clamp block 284. By loosening wing bolt 285 plate 281 can be pivoted about bolt 283 to swing solenoid 276 out of the way after its shaft 275 is disconnected from bar 274. The solenoid 276 can be disconnected from plate 281 and replaced by another solenoid. Then plate 281 is pivoted to the position where its shaft 275 is connected to bar 274. The wing bolt is tightened.

The top end of plunger 250 is threaded into a yoke block 287 which has a horizontal aperture in alignment with the apertures in the bottom bifurcated ends of a plunger yoke 288 for receiving a connecting bar 289. The shaft of bar 289 has a peripheral groove which is engaged by the end of a spring plunger 290 mounted in yoke block 287. By this construction plunger 250 is connected to plunger yoke 288 but they are readily disconnected from yoke 288 by pulling on plunger 290.

The top of plunger yoke 288 has a vertical aperture in which is threaded an adjusting screw 291 which can be fixed by a nut 292. The shank of adjusting screw 291 has a peripheral groove adjacent its head so that screw 291 supports an adjusting screw block 293. With this construction the block 293 is adjustably fixed in position between the bifurcated arms of plunger yoke 288.

Plates 294 and 295 are bolted on the vertical sides of plate 243 with plunger yoke 288 between them. The plates 294 and 295 have aligned apertures to receive a pin 296 between them. The pin 296 pivotally supports a retaining arm 297 which is bifurcated at its top end to support between these bifurcated ends a roller 298. Each of the bifurcated ends of arm 297 has connected to it a spring 299. The other ends of springs 299 are connected to plates 294 and 295. Thus roller 298 is spring-biased toward a roller block 300 mounted on the top portion of plunger yoke 288. The retaining arm 297 pivotally supports a screw 301 (FIG. 18) which is threaded into a switch 302 which has an arm 303 on which is mounted a handle 304. A spring plunger 305 is mounted on switch 302. The retaining arm 297 has two recesses which are disposed in an arc about the pivot axis of screw 301. The spring plunger 305 retains switch 302 in one of two positions depending upon the recess of retaining arm 297 in which spring plunger 305 is positioned. The plunger 305 is moved out of this position and switch 302 pivoted to the other position by movement of arm 303.

The switch 302 has an inclined surface 306 so that as switch 302 is pivoted the inclined cam surface 306 moves along an edge of plate 294. As a result, in one pivotal position of switch 302 retaining arm 297 is in the position shown in FIG. 12 and in full lines in FIG. 16, whereas in the other pivotal position of switch 302 (shown in phantom in FIG. 16 and in full lines in FIG. 18) springs 299 move retaining arm 297 to position roller 298 below roller block 300. In the latter position roller 298 prevents lowering of block 300 and thus prevents lowering of plunger yoke 288. A roller 307 below block 293 is rotatably mounted on a pin 308 mounted on a bifurcated end of a lifting arm 309. The arm 309 is mounted on square shaft 170 for pivot with rotation of shaft 170. The plates 294 and 295 support roller bearings 310 which abut plunger yoke 288.

The plunger 250 is biased downwardly by a spring 311 enclosed within guide housings 279 and 280.

When bridge 45 is at its home position with follower 50 resting on cam 51, lifting arm 30 is in the position shown in FIGS. 12 and 18. As bridge 45 moves away from its home position follower 50 rides down on inclined surface 176, actuating arm 172 pivots to rotate square shaft 170 counterclockwise (as viewed in FIGS. 12 and 18) lowering roller 307 so that block 293, plunger yoke 288 and plunger 250 are lowered thereby lowering cutter wheel 263 onto glass sheet G into scoring position. This occurs so long as roller 298 is not directly below block 300. However, when roller 298 is directly below block 300 with switch 302 in the position shown in FIG. 18, the lowering of cutter wheel 263 is prevented.

An operator determines which cutter assemblies 49 are to be used for a scoring operation on glass sheet G by a proper positioning of switches 302. When an operator wishes to cancel, for an individual scoring operation, one of cutter assemblies 49 either on bridge 45 or bridge 47, solenoid 276 of cutter assembly 49 to be cancelled from operation is energized by closing an electrical circuit (not shown). The energization of this solenoid 276 lifts shaft 275 thereby lifting arm 272 so that when square shaft 170 is rotated to lower plunger 250 pin 271 is lowered into abutment with raised arm 272. The arm 272 prevents further lowering of turret cutter 259 and the end of arm 256 on which turret cutter 259 is mounted. Then arm 256 pivots about pin 253. This prevents cutter wheel 263 from engaging glass sheet G. This is a temporary means for keeping a particular cutter assembly from engaging in a scoring operation. When it is desired to prevent a particular cutter assembly 49 from being used in a series of scoring operations, it is preferable to pivot switch 302 to the position shown in FIG. 18 rather than rely upon continued energization of solenoid 276 of that cutter assembly 49.

Referring to FIG. 22, electrical lines L1 and L2 are connected to a 110-volt A.C. source (not shown). The various circuits connected to lines L1 and L2 contain either a coil of a relay, an electric timer or a solenoid of a solenoid-operated, spring-biased, 4-way valve. The coils are designated 1FSM, 1RSM, 2RSM, 1FCM, 1RCM, 2RCM, BCM, BCT, BCBC, 1TCR, 1CR, 2TCR, 2CR, 3TCR, 3CR, 4TCR, 4CR, 5CR, 6CR, 7CR, 8CR and 9CR. The electronic timer is designated ETCR. The solenoids are 1SV, 2SV, 3SV and 4SV.

The relay having coil 1FSM has contacts 1–1FSM, 1–2FSM, 1–3FSM, 1–4FSM, 1–5FSM, 1–6FSM, 1–7FSM, 1–8FSM, 1–9FSM, 1–10FSM and 1–11FSM. The relay having coil 1RSM has contacts 1–1RSM, 1–2RSM, 1–3RSM, 1–4RSM, 1–5RSM, 1–6RSM, 1–7RSM, 1–8RSM and 1–9RSM. The relay having coil 2RSM has contacts 2–1RSM, 2–2RSM, 2–3RSM, 2–4RSM, 2–5RSM and 2–6RSM. The relay having coil 1FCM has contacts 1–1FCM, 1–2FCM, 1–3FCM, 1–4FCM, 1–5FCM, and 1–6FCM. The relay having coil 1RCM has contacts 1–1RCM, 1–2RCM, 1–3RCM, 1–4RCM, and 1–5RCM. The relay having coil 2RCM has contacts 2–1RCM. The relay having coil BCM has contacts 1–1BCM and 1–2BCM. The relay of the off-delay type having coil BCT has contacts 1–1BCT and 1–2BCT. The relay having coil BCBC has contacts 1–1BCBC and 1–2BCBC. The timer relay of the on-delay type having coil 1TCR has a contact (not shown) which is referred to later. The relay having coil 1CR has contacts 1–1CR, 1–2CR, 1–3CR and 1–4CR. The timer relay of the off-delay type having coil 2TCR has a contact 2–1TCR. The electronic timer ETCR has a contact 1–1ETCR. The relay having coil 2CR has contacts 2–1CR, 2–2CR, 2–3CR and 2–4CR. The timer relay of the on-delay type having coil 3TCR has contacts 3–1TCR, 3–2TCR and 3–3TCR. The relay having coil 3CR has contacts 3–1CR, 3–2CR, 3–3CR, 3–4CR and 3–5CR. The timer relay of the on-delay type having coil 4TCR has a contact 4–1TCR. The relays having coils 4CR, 5CR, 6CR, 7CR and 8CR have contacts 4–1CR, 4–2CR and 4–3CR, 5–1CR and 5–2CR, 6–1CR, 6–2CR, 6–3CR and 6–4CR, 7–1CR, 7–2CR and 7–3CR, and 8–1CR, respectively.

The coil 1FSM is in a circuit between lines L1 and L2 in series with normally open contact 1–1CR, normally closed contact 2–1CR, a normally closed contact 1–1LS of a limit switch 1LS, normally open contact 4–1CR, normally closed contact 2–1RSM and normally closed contact 1–1RSM. This circuit, except for contacts 1–1CR and 2–1CR, is also connected to line L1 by a normally open contact 1–1FSM which provides a holding subcircuit for coil 1FSM when contact 1–1CR opens.

Another circuit between lines L1 and L2 contains coil 1RSM in series with a normally open contact 1–2LS of switch 1LS, normally closed, time-opening contact 3–1TCR, normally closed contact 3–1CR, and normally closed contact 1–2FSM. The normally open contact 1–2RSM is in a holding subcircuit for coil 1RSM. This subcircuit is in parallel with contact 1–2LS and contact 3–1TCR. Another subcircuit in parallel with contact 1–2LS and 3–1TCR contains normally open contacts 3–2CR and 1–1RCM. In parallel with contacts 3–1CR and 1–2FSM and coil 1RSM is a subcircuit containing normally open contact 3–3CR and coil 2RSM. The coils 1FSM, 1RSM and 2RSM are connected to line L2 through a pair of normally closed contacts OL of a safety overload relay.

The coil 1FCM is in another circuit in series with normally closed contacts 1–3FSM and 5–1CR, normally open contacts 3–4CR and 2–2CR, and normally closed contacts 1–2RCM and 2–1RCM. The portion of one of the previously mentioned circuits that contains coil 1RSM and contacts 3–1CR and 1–2FSM and the portion of another previously mentioned circuits that contains coil 2RSM and contact 3–3CR are connected to this circuit through normally open contact 1–1FCM so that when contacts 1–3FSM, 3–4CR, 2–2CR, 5–1CR and 1–1FCM are closed, current can flow to these portions of the previously mentioned circuits.

The coil 1RCM is in another circuit in series with normally open contact 3–5CR, normally open, time-closing contact 4–1TCR, normally closed contact 1–2FCM and normally closed contact 4–2CR. In parallel with contact 4–2CR and coil 1RCM is a subcircuit containing in series normally open contact 4–3CR and coil 2RCM. In parallel with contacts 3–5CR and 4–1TCR is normally open contact 1–4FSM in one subcircuit and normally open contact 1–3RSM in a second subcircuit. The coils 1FCM, 1RCM and 2RCM are connected to line L2 through a pair of normally closed contacts OL which are in a safety overload relay.

The coil BCM, which is the coil of a starter relay for the motor that drives belt 44, is in a circuit in series with a normally open limit switch 2LS and normally closed contacts 2–3CR and 1–1BCBC. In parallel with coil BCM is coil BCT so that it is energized when coil BCM is energized. The coil BCBC is in a relay for the braking coil for the motor which is operated by the energization of coil BCM. When coil BCM is deenergized and coil BCBC is energized, this motor promptly stops to index properly glass sheet G as described later. The coil BCBC is in a circuit containing normally open, time-opening contact 1–1BCT and normally closed contact 1–2BCT. The coils BCM, BCT and BCBC are connected to line L2 through a pair of contacts OL of a safety overload relay.

The coil 1TCR is in a circuit in series with normally closed contact 1–1BCM.

The coil 1CR is in a circuit in series with normally open contacts 3LS, 4LS and 5LS which are in the path of travel of glass sheet G so that they are closed by the sheet just before it reaches belt 44. Of course, switches 3LS, 4LS and 5LS remain closed until the trailing edge of sheet G passes beyond these switches which are spaced from one another transversely of this path of travel of sheet G.

The coil 2TCR is in a circuit in series with normally open contact 1–2CR.

The timer ETCR is connected to line L2 by line L3 and is connected to line L1 by line L4 for power operation of timer ETCR and also connected to line L1 through a circuit containing normally closed contact 1–3CR, which when closed initiates the operation of timer ETCR for a period of time at the end of which normally open contact 1–1ETCR of the time-closing type is closed.

The coil 2CR is in a circuit in series with contact 1–1ETCR, mentioned above, normally closed contact 1–4CR, normally open, time-opening contact 2–1TCR and normally closed contact 5–2CR. The normally open contact 2–4CR is in a holding subcircuit in parallel with contacts 1–1ETCR, 1–4CR and 2–1TCR.

The coil 3TCR is in a circuit in series with normally open contact 1–5FSM and a normally closed limit switch 6LS. The switch 6LS (FIGS. 20 and 21) is opened by pusher plates 72 when the latter has moved its maximum distance for the movement of glass sheet G in the squaring operation. In parallel with contact 1–5FSM is normally open contact 3–2TCR in a holding subcircuit.

The solenoid 1SV is in a circuit in series with normally open, time-closing contact 3–3TCR, normally closed contact 1–2BCM and normally open contact 1–2BCBC.

The coils 3CR and 4TCR are in parallel with each other and are in series with a normally open limit switch 7LS in another circuit between lines L1 and L2. The switch 7LS is tripped closed by bridge 47 when the latter is at its home position.

The coil 4CR is in a circuit in series with a normally open limit switch 8LS which is closed when bridge 45 is at its home position. A normally open push-button switch 1PB is in parallel with switch 8LS and in series with coil 4CR.

The coil 5CR is in a circuit in series with a normally open limit switch 9LS which is tripped closed by bridge 45 after it has moved away from its home position to a position beyond the scoring operation on glass sheet G. The energization of coil 5CR indicates that the cross scoring or cutting has been completed and stops the movement of bridge 45 away from its home position.

The coil 6CR is in a circuit in series with normally closed contact 7–1CR, a normally closed contact 10–1LS of a limit switch 10LS and normally open contact 1–6FSM. The switch 10LS is tripped by bridge 47 before it has completed its maximum travel away from its home position. In parallel with contacts 1–6FSM and 10–1LS but in series with contacts 7–1CR and coil 6CR are three subcircuits. One of these subcircuits includes in series normally open contact 1–4RSM and a normally closed contact 11–1LS of a limit switch 11LS which is opened when bridge 47 has almost reached its home position in its return movement. The second subcircuit has normally open contact 1–3FCM and a normally closed contact 12–1LS of a limit switch 12LS which is tripped when bridge 45 has almost reached its maximum desired position of travel away from its home position. The third subcircuit contains normally open contact 1–3RCM and a normally closed contact 13–1LS of a limit switch 13LS which is opened when bridge 45 almost reaches its home position in its return travel.

The coil 7CR is in a circuit in series with normally closed contact 6–1CR, normally open contact 1–7FSM and a normally open contact 10–2LS of switch 10LS. In parallel with contacts 1–7FSM and 10–2LS are three subcircuits which are in series with contact 6–1CR and coil 7CR. One of these subcircuits has a normally open contact 1–5RSM and a normally open contact 11–2LS of switch 11LS. The second subcircuit has normally open contact 1–4FCM and a normally open contact 12–2LS of switch 12LS. The third subcircuit has normally open contact 1–4RCM and a normally open contact 13–2LS of switch 13LS.

The solenoid 2SV is in a circuit in series with normally open contacts 1–5FCM and 6–2CR.

The solenoid 3SV is in a circuit in series with normally open contact 1–5RCM.

The coil 8CR and solenoid 4SV are in parallel with each other and both are in series with a normally closed limit switch 14LS, normally open contact 1–6RSM and a normally open limit switch 15LS. In parallel with switch 15LS is normally open contact 8–1CR in a holding subcircuit for coil 8CR.

The apparatus, as seen in FIG. 23, is provided with an alternating current motor M that drives a D.C. generator DCG and an alternating current exciter E. The motor M is connected by electrical lines L6, L7 and L8 through normally open contacts 10–1CR of a starter coil relay to a 440-volt A.C. power source. The strip cut drive motor 48 has an armature 48A and a series field 48SF. Direct current from generator DCG passes through a circuit having armature 48A of drive motor 48, series field 48SF of motor 48 and contacts when all of the contacts in this circuit are all closed. The flow of current through series field 48SF is always in the same direction. The direction of flow of current through armature 48A is dependent upon which subcircuit is utilized.

When the relay for coil 1FSM is energized, normally open contacts 1–8FSM and 1–9FSM close so that the flow of current through armature 48A operates the motor for forward drive of bridge 47 away from its home position. When the relay having coil 1RSM is energized, normally open contacts 1–7RSM and 1–8RSM close so that the flow of the current through armature 48A is in the opposite direction.

The speed of operation of motor 48 is dependent upon the flow of current through armature 48A and series field 48SF. The same is true for motor 46, i.e., its speed depends on current flow through its armature 46A and series field 46SF (both not shown). This flow is dependent upon the direct current voltage provided by generator DCG. Each of the motors 46 and 48 has a shunt field 46ShF and 48ShF, respectively, through which passes alternating current provided by exciter E. This alternating current is always provided by exciter E, whereas current through armature 48A and series field 48SF of the strip cut drive motor 48 occurs only when either coil 1FSM or 1RSM is energized.

The circuit from generator DCG through armature 48A and series field 48SF of strip cut drive motor 48 has normally closed contact 2–2RSM between series field 48SF and generator DCG and has normally closed contact 2–3RSM between series field 48SF and armature 48A. These contacts 2–2RSM and 2–3RSM are present in the circuit to insure that generator DCG cannot operate strip cut drive motor 48 when bridge 47 is at its home position until another glass sheet G, sensed by limit switches 3LS, 4LS and 5LS, is being moved toward the cutting position by feeding conveyor 30.

The generator DCG provides a constant voltage which may be one of two predetermined voltages. The voltage provided by generator DCG is dependent upon the alternating current flow through the general field winding GF of generator DCG. Which one of the two voltages is determined by which one of coils 6CR and 7CR is energized as explained below. The filed winding GF is connected to one terminal of exciter E through any one of four normally open contacts 1–10FSM, 1–9RSM, 1–2FCM and 1–2RCM. These four contacts are in parallel with one another. Thus the field winding GF of D.C. generator DCG is not provided with A.C. current unless any one of coils 1FSM, 1RSM, 1FCM and 1RCM is energized. The field winding GF of generator DCG is connected to the other terminal of exciter E through two parallel circuits, one of which has in series normally open contacts 6–3CR and 6–4CR and a variable rheostat 1VR. The other parallel circuit connecting field winding GF of generator DCG has in series normally open contacts 7–2CR and 7–3CR, a variable rheostat 2VR and a resistor 1Re. A resistor 2Re connects winding GF to these two parallel circuits.

With any one of coils 1FSM, 1RSM, 1FCM and 1RCM energized and with coil 6CR energized to close contacts 6–3CR and 6–4CR alternating current flow through generator DCG field winding GF is predetermined by the position of the variable rheostat 1VR. This current flow determines the voltage of generator DCG to armature 48A or 46A and series field 48SF or 46SF. When contacts 7–2CR and 7–3CR close, current instead flows through rheostat 2VR and resistor 1Re, so that there is less current flow through field winding GF of generator DCG than when coil 6CR is energized. Then a lower voltage is applied to the circuit containing armature 48A and series field 48SF of the strip cut drive motor 48 if one of coils 1FSM and 1RSM is energized instead of one of coils 1FCM and 1RCM.

The exciter E provides alternating current continuously to the shunt fields 48SF and 46SF of the strip cut drive motor 48 and the cross cut drive motor 46, respectively, because circuits for these shunt fields contain no contacts.

The D.C. generator DCG is also connected in a circuit having the series field winding 46SF of the cross cut drive motor and its armature in series in circuits which are constructed as described above for armature 48A and series field 48SF so that the flow of current through armature 46A of motor 46 is in one direction or the other, dependent upon which one of coils 1FCM and 1RCM is energized. Of course, this current from generator DCG flows in one direction through field winding 46SF regardless of the direction of flow through armature 46A of strip cut drive motor 46.

From the foregoing description it is apparent that the energization of either coil 6CR or coil 7CR determines the parallel circuit containing a variable rheostat which is utilized to provide current flow through general field winding GF of generator DCG. Thus the energization of either coil 6CR or coil 7CR determines the speed of operation of either strip cut drive motor 48 or cross cut drive motor 46. The direction of rotation of armature 48A of strip cut drive motor 48 depends on which one of coils 1FSM and 1RSM is energized. Similarly the direction of rotation of armature 46A of cross cut drive motor 46 depends upon which one of coils 1FCM and 1RCM is energized. If neither one of coils 1FSM and 1RSM is energized, the generator does not operate strip cut drive motor 48. Similarly if neither one of coils 1FCM and 1RCM is energized, the generator does not drive cross cut motor 46 by flow through armature 46A and series field winding 46SF.

Each of the two terminals of armature 48A is connected also to a low voltage D.C. source through lines L9 and L10 and normally open contacts 2–4RSM and 2–5RSM so that current flows from the D.C. source only when coil 2RSM is energized. This occurs after the strip cutting bridge 47 returns to its home position. This connection of armature 48A to the D.C. source provides a slight torque in the reverse direction to motor 48 by current flow through the armature. This holds bridge 47 against the stop members at its home position as mentioned earlier. The armature 46A of cross cut drive motor 46 is similarly connected to a D.C. source through electrical lines and normally open contacts 2–2RCM and 2–3RCM (both not shown) so that cross cutting bridge 45 is maintained at its home position upon its return from the cross cutting operation. This D.C. source provides a flow of D.C. current in a correct direction when contacts 2–2RCM and 2–3RCM are closed by the energization of coil 2RCM.

Parallel to armature 48A of motor 48 is a subcircuit containing in series a resistor 3Re and normally closed contacts 1–11FSM, 1–10RSM and 2–6RSM. This is a safety subcircuit that has one of these normally closed contacts open at any given time, except when the entire apparatus is being shut down. At that time the induced voltage of motor 48 must be dissipated and this is accomplished by this subcircuit. There is a similar subcircuit in parallel with armature 46A and it contains in series normally closed contacts of relays having coils 1FCM, 1RCM and 2RCM.

A bracket 312 is mounted on the left-hand end of channel iron 109 (as viewed in FIG. 2). The bracket 312 supports cams 313, 314 and 315. The channel iron 115 of bridge 47 supports a cam 316. As shown in FIG. 2, limit switches 1LS, 2LS and 7LS through 15LS are mounted on supporting structure 45.

The switch 8LS is closed by bridge 45 when the latter is at its home position. When bridge 47 approaches its extreme left-hand position of travel, cam 316 trips switch 10LS and then trips switch 1LS. In the return travel bridge 47 trips and closes switch 15LS. Before bridge 47 reaches its home position it trips and opens switch 14LS.

When bridge 45 moves beyond belt 44 after cutter wheels 263 have passed sheet G, cam 313 trips switch 12LS. Shortly thereafter cam 313 trips switch 9LS to close it for a brief period of time. During the return travel of bridge 45 cam 315 trips switch 13LS to change the drive of bridge 45 to slow speed. Just before bridge 45 reaches its home position to close switch 8LS, cam 314 trips and closes switch 2LS.

The switches 3LS through 5LS are shown only in FIG. 22. They are mounted to be tripped by sheet G just before it reaches belt 44. The switch 6LS is mounted on plate 161 and is tripped open by pusher plate 72 as it moves forward in pushing sheet G.

The square bar 170 on bridge 47, that is rotated to lower cutter assemblies 49 on that bridge, is connected at one end to an air cylinder 317 by a crank arm 318 connected to piston rod 319 of cylinder 317. The actuation of cylinder 317 results in the rotation of this square shaft.

*Operation*

Assume that contacts 10–1CR are closed so that A.C. motor M is operating. Assume that bridge 45 and 47 are at their home positions so that switches 2LS, 7LS and 8LS are closed. The switch 9LS is open. The contact 1–1LS is closed and contact 1–2LS is open. The switches 3LS, 4LS and 5LS are open, because it is assumed at the start that a glass sheet G is not being fed to conveyor 25. The positioning mechanism 71 is at its home position so that limit switch 6LS, which is not tripped by one of pusher plates 72, is closed. The switches 10LS through 13LS have contacts 10–1LS, 11–1LS, 12–1LS and 13–1LS closed and contacts 10–2LS, 11–2LS, 12–2LS and 13–2LS open. The switch 14LS is closed and switch 15LS is open.

Because switch 2LS and contacts 2–3CR and 1–1BCBC are closed, coils BCM and BCT are energized. With coil BCM energized the motor for conveyor 25 is operating so that belt 44 is moving across table 70.

Because coil BCM is energized, contact 1–1BCM is closed and thus coil 1TCR is energized. The relay having coil 1TCR has a normally open contact of the on-delay or time-closing type (not shown) in an electrical circuit (not shown) that controls the operation of the motor for driving feeding conveyor 30. It is necessary for this contact to be closed for conveyor 30 to operate. It is assumed that the delay period of this contact has expired so that the contact is closed and conveyor 30 is operating. As described later, coil BCM is deenergized prior to the scoring operations by cutter assemblies 49 on bridges 45 and 47 and remains deenergized during these scoring operations.

With coil BCT energized, contact 1–1BCT is closed but contact 1–2BCT is open so that coil BCBC is not energized. The contacts 3–3TCR, 1–2BCM and 1–2BCBC are open so that solenoid 1SV is not energized. Also contact 1–1BCBC is closed.

Because switches 3LS through 5LS are open, coil 1CR is not energized. The contacts 1–1CR and 1–2CR are open, so that coils 1FSM and 2TCR are not energized. However, contact 1–3CR is closed so that electronic timer ETCR is operating and contact 1–1ETCR is closed. Although contact 1–4CR is closed along with contacts 1–1ETCR and 5–2CR, contact 2–1TCR is open so that coil 2CR is not energized. The contact 2–1TCR is open because coil 2TCR is not energized. The contact 5–2CR is closed because coil 5CR is not energized due to the fact that switch 9LS is open. Accordingly, only contact 2–1TCR is preventing energization of coil 2CR.

Because switches 7LS and 8LS are closed, coils 3CR, 4TCR and 4CR are energized. With coil 4CR energized contact 4–1CR is closed. The coils 1RSM and 2RSM are not energized, for the reason presented below, so that contacts 1–1RSM and 2–1RSM are closed. As mentioned earlier, contact 1–1LS is closed. Because coil 2CR is not energized, contact 2–1CR is closed. Thus in the circuit containing coil 1FSM only contact 1–1CR is open. Thus coil 1FSM is not energized. The contact 1–1FSM in its holding circuit is open.

Because coil 1FSM is not energized, contact 1–2FSM is closed. The contact 1–5FSM in the circuit with coil 3TCR is open because coil 1FSM is not energized. Thus coil 3TCR is not energized, even though switch 6LS is closed. The contact 3–1TCR is closed. However, contact 1–2LS is open. Also contact 3–1CR is open because coil 3CR is energized with switch 7LS closed. Accordingly, coil 1RSM is not energized and thus contact 1–2RSM in its holding circuit is open.

With coil 3CR energized contact 3–3CR is closed. However, with contact 1–2LS being open, coil 2RSM is not energized even though contact 3–1TCR is closed. With coil 3CR energized contact 3–2CR is closed but contact 1–1RCM is open because coil 1RCM is not energized as explained below. Thus the circuit that contains contacts 3–2CR, 1–1RCM and 3–3CR cannot energize coil 2RSM at this time.

In the circuit containing coil 1FCM, contact 1–3FSM is closed because coil 1FSM is not energized. In the circuit contact 3–4CR is closed because coil 3CR is energized. Contact 5–1CR is closed because coil 5CR is not energized at this time. However, contact 2–2CR is open because coil 2CR is not energized. The contacts 1–2RCM and 2–1RCM are closed and open, respectively, because coil 1RCM is not energized and coil 2RCM is energized. The coil 1FCM is not energized because contacts 2–2CR and 2–1RCM are open.

Because coil 1FCM is not energized, contact 1–1FCM is open so that even if contact 2–2CR were closed coil 2RSM could not be energized at this time.

In the circuit containing coil 1RCM, contact 3–5CR is closed because coil 3CR is energized. The coil 4TCR is also energized. It is assumed that the apparatus has been operating for a period of time beyond the delay period of contact 4–1TCR so that the latter is closed. Because coil 1FCM is not energized, contact 1–2FCM is closed. Because coil 4CR is energized, contact 4–2CR is open. This prevents energization of coil 1RCM. However, contact 4–3CR is closed so that coil 2RCM is energized. Because coil 1FSM is not energized, contact 1–4FSM is open. Because coil 1RSM is not energized, contact 1–3RSM is open. The contacts 3–5CR and 4–1TCR open when bridge 47 leaves its home position because switch 7LS opens. At this time contact 1–4FSM closes to keep coil 2RCM energized. When contact 1–4FSM opens, contact 1–3RSM closes to keep coil 2RCM energized until contact 1–2FCM opens, as described later.

Because none of coils 1FSM, 1RSM, 1FCM and 1RCM is energized, contacts 1–6FSM, 1–4RSM, 1–3FCM and 1–3RCM are open. The contacts 10–1LS, 11–1LS, 12–1LS, 13–1LS and contact 7–1CR are closed. Coil 6CR is not energized and contact 6–1CR is closed. The contacts 1–7FSM, 1–5RSM, 1–4FCM and 1–4RCM and contacts 10–2LS, 11–2LS, 12–2LS and 13–2LS are open, so that coil 7CR is not energized.

Because coils 1FCM and 6CR are not energized, contacts 1–5FCM and 6–2CR are open so that solenoid 2SV is not energized. Because coil 1RCM is not energized, contact 1–5RCM is open so that solenoid 3SV is not energized. Because switch 15LS is open and because coil 1RSM is not energized so that contact 1–6RCM is open, coil 8CR and solenoid 4SV are not energized even though switch 14LS is closed. Of course, with coil 7CR not energized, contact 8–1CR in its holding circuit is not energized.

Because no one of coils 1FSM, 1RSM, 1FCM and 1RCM is energized, contacts 1–10FSM, 1–9RSM, 1–6FCM and 1–6RCM are open. Furthermore, contacts 6–3CR, 6–4CR, 7–2CR and 7–3CR are open because coils 6CR and 7CR are not energized. This current cannot flow through the general field winding GF of generator DCG.

Because coil 2RSM is not energized, contacts 2–2RSM and 2–3RSM are closed so that current cannot flow through series field winding 48SF. However, normally closed contacts of the relay having coil 2RCM in series with the series field 46SF for motor 46 are open. Current flow from generator DCG through armature 48A and series field 48SF is prevented because coils 1RSM and 1FSM are not energized so that contacts 1–7RSM and 1–8RSM are open in one circuit and contacts 1–8FSM and 1–9FSM are open in another circuit. Similarly current flow from generator DCG through the armature of motor 46 or its series field is prevented because coils 1FCM and 1RCM are not energized. Because coil 2RSM is not energized, contacts 2–4RSM and 2–5RSM are open so that current cannot flow through armature 48A by the D.C. circuit containing these contacts to provide the torque for motor 48 that holds bridge 47 against the stop members at its home position. Because coil 2RCM is energized, the normally open contacts of the relay having coil 2RCM are closed to connect the armature of motor 46 to a D.C. source by lines similar to lines L9 and L10 for armature 48A. Thus motor 46 provides a torque in the right direction to hold bridge 45 at its home position against the stop members.

Let us assume now that a glass sheet G is being moved by conveyor 30 toward apparatus 25. The leading edge of sheet G trips and closes switch 3LS, 4LS and 5LS. This energizes coil 1CR to close contact 1–1CR so that coil 1FSM is energized. The contact 1–1FSM closes in the holding circuit for coil 1FSM. The contact 1–5FSM closes to energize coil 3TCR. The contact 3–2TCR in the holding circuit for coil 3TCR closes to maintain energization of coil 3TCR.

Upon the energization of coil 1FSM, contact 1–2FSM opens. Upon the energization of coil 3TCR, after a delay contact 3–1TCR opens. Coil 1RSM is already deenergized because contacts 1–2LS and 3–1CR are open.

Upon the energization of coil 1FSM, contacts 1–8FSM and 1–9FSM close, so that current flows through armature 48A in the forward drive direction and through series field 48SF. The contact 1–6FSM closes so that coil 6CR is energized to close contacts 6–3CR and 6–4CR. The contact 1–10FSM also closes upon energization of coil 1FSM so that current now flows through general field winding GF, resistor 2Re and variable rheostat 1VR. As a result, generator DCG provides current at the higher voltage through armature 48A and through series field 48SF to operate motor 48 at fast speed. The motor 48 drives bridge 47 at fast speed away from its home position, i.e., in the direction of movement of and forwardly of sheet G.

The energization of coil 1CR also closes contact 1–2CR to energize coil 2TCR so that contact 2–1TCR closes. However, contact 1–4CR opens when coil 1CR is energized. Thus coil 2CR is not energized.

When cam 316 on bridge 47 trips switch 10LS, contact 10–2LS closes and contact 10–1LS opens. The coil 6CR is deenergized so that contact 6–3CR and contact 6–4CR open and contact 6–1CR closes. The coil 7CR is energized to close contacts 7–2CR and 7–3CR. Current now flows through field winding GF, resistor 2Re, variable rheostat 2VR and resistor 1Re so that generator DCG now provides the lower voltage to motor 48. The bridge 47 now moves at the slower speed. Of course, when coil 7CR is energized, contact 7–1CR opens to prevent energization of coil 6CR at this time.

While bridge 47 is moving at slow speed, the trailing edge of sheet G passes beyond switches 3LS, 4LS and 5LS so that they open and coil 1CR is deenergized. The electronic timer ETCR stopped when contact 1–3CR opened upon the energization of coil 1CR. However, now contact 1–3CR closes, because of the deenergization of coil 1CR, to start timer ETCR. At the same time contact 1–2CR opens to deenergize coil 2TCR and contact 1–4CR closes. When coil 2TCR is deenergized, contact 2–1TCR does not open immediately because it is of the time-opening type. After the delay for which electronic timer ETCR is set, contact 1–1ETCR, which is of the time-closing type, closes. This occurs before contact 2–1TCR opens so that coil 2CR is energized. Although contact 2–1TCR opens shortly thereafter, energization of coil 2CR continues because contact 2–4CR, in the holding circuit for coil 2CR, closes upon the initial energization of coil 2CR.

The electronic timer ETCR keeps contact 1–1ETCR closed until coil 1CR is energized to open contact 1–3CR and, of course, at the same time contact 1–4CR opens. This occurs when the next glass sheet G closes switches 3LS, 4LS and 5LS in the next cycle of operations.

The energization of coil 2CR indicates the presence of glass sheet G at the position where it should be stationary for the scoring operations. The energization of coil 2CR stops the drive of the motor for conveyor 45 in the following manner. The energization of coil 2CR opens contact 2–3CR to deenergize coils BCM and BCT. The deenergization of coil BCM results in the opening of contact 1–1BCM to deenergize coil 1TCR. When coil BCT is deenergized, contact 1–2BCT closes but contact 1–1BCT does not open until after a delay because it is of the time-opening type. Thus the coil BCBC is energized through contacts 1–2BCT and 1–1BCT for a short period of time until contact 1–1BCT opens. The energization of coil BCBC opens contact 1–1BCBC to prevent the energization of coil BCM during the time that energized coil BCBC operates the braking coil for the motor that drives belt 44. The energization of coil BCBC for the brief period of time through the braking coil promptly stops the drive of belt 44 so that glass sheet G is properly indexed on apparatus 25. Of course, when coil BCBC is deenergized, contact 1–1BCBC closes but coils BCM and BCT are not energized because contact 2–3CR is still energized.

It is seen that the passing of the trailing edge of sheet G beyond switches 3LS through 5LS initiates after a delay the deenergization of coil BCM and the energization of coil BCBC to stop belt 44. The time of the delay is determined by the setting of timer ETCR. For sheets G of different dimensions as measured in the direction of travel of sheets G on belt 44 different settings of delay are used for timer ETCR so that each sheet G regardless of the dimension in this direction is stopped with the leading edge of each sheet indexed at the same position. This is used to index the trailing edge of each sheet G in the embodiment shown in the drawings in which bar 76 is fixed and bar 77 is movable laterally.

When coil 1CR is deenergized by the opening of switches 3LS, 4LS and 5LS, this does not result in the deenergization of coil 1FSM because of the holding circuit containing now closed contact 1–1FSM. After contact 1–1CR opens, contact 2–1CR opens through the energization of coil 2CR. The contact 2–1CR is another safety contact in the circuit.

The bridge 47 continues to move forwardly at slow speed. The cam 316 trips switch 1LS to open contact 1–1LS and close contact 1–2LS. Because contact 1–1LS is between contact 1–1FSM and coil 1FSM, the opening of contact 1–1LS results in the deenergization of coil 1FSM. The contacts 1–6FSM, 1–7FSM and 1–10FSM open. The opening of contact 1–7FSM results in the deenergization of coil 7CR so that contact 7–1CR closes, but coil 6CR is not energized through contacts 1–6FSM and 10–1LS, as it was originally, because these contacts are now open.

When coil 7CR is deenergized, contacts 7–2CR and 7–3CR open. The contact 1–10FSM is also open. Current cannot flow through winding GF. Upon the deenergization of coil 1–FSM contacts 1–8FSM and 1–9FSM open, so that current stops flowing through the circuit containing these contacts for this direction of flow of current through armature 48A and then through series field winding 48SF.

As mentioned earlier, the initial energization of coil 1FSM closed contact 1–5FSM to energize coil 3TCR resulting in the opening after a delay of contact 3–1TCR. Although contact 1–5FSM opens when coil 1FSM is deenergized, as described above, the energization of coil 3TCR continues because contact 3–2TCR in the holding circuit for coil 3TCR is now closed.

When coil 3TCR is energized, contact 3–3TCR after its delay closes. This occurs while belt 44 is still moving glass sheet G into the scoring position and coil BCM is energized. Thus contact 1–2BCM is open. Because at this time coil BCBC is not energized, contact 1–2BCBC is open. As described earlier, when the trailing edge of glass sheet passes beyond switches 3LS through 5LS, coil BCM is deenergized to close contact 1–2BCM. The coil BCBC is energized for a short period. During this period of time contact 1–2BCBC is closed to energize solenoid 1SV. Then contact 1–2BCBC opens to deenergize solenoid 1SV. When solenoid 1SV is energized, it moves a spool in a solenoid-operated, spring-based, 4-way valve (not shown) from a first position to a second position.

With the spool in the second position pressurized air is fed through the valve to the upper chamber of air cylinder 148 and air is exhausted from the lower chamber of cylinder 148 through valve. This results in the retraction of piston rod 145 thereby moving pusher plates 72 so that facing members 73 are moved across table 70 and belt 44 into engagement with the opposing edge of sheet G. The facing members 73 then move sheet G to the indexed position where one of pusher plates 72 trips and opens switch 6LS to deenergize coil 3TCR.

The deenergization of coil 3TCR results in the opening of contact 3–3TCR immediately. It also results in the closing immediately of contact 3–1TCR. The contact 3–1CR closed when bridge 47 left its home position because switch 7LS opened to deenergize coil 3CR. The contact 1–2FSM closed when coil 1FSM was deenergized by the opening of contact 1–1LS. The contact 1–2LS closed closed at that time. Thus coil 1RSM is energized. In the event that coil 3TCR is deenergized to open contact 3–3TCR for the deenergization of solenoid 1SV before switch 1LS is tripped, contact 1–5FSM would still be closed. Thus when limit switch 6LS returns to its closed position, coil 3TCCR would be energized to close contact 3–3TCR, if the latter contact were of the instantaneous type. This would result in energization again of solenoid 1SV if coil BCBC were still energized, because contact 1–2BCBC would still be closed. This is the reason that contact 3–3TCR is of the time-closing type. It insures that it will not close until a period of time has transpired during which coil BCBC is deenergized.

When solenoid 1SV is deenergized, the spring of the valve moves the spool from the second position to the first position so that pressurized air is now fed through the valve to the lower chamber of cylinder 149 and air is exhausted from the lower chamber of cylinder 149. This results in the extension of piston rod 145 thereby moving pusher plates 72 away from sheet G.

Because coil 1RSM is now energized, contact 1–1RSM is open and contacts 1–2RSM, 1–3RSM, 1–4RSM, 1–5RSM, 1–6RSM, 1–7RSM, 1–8RSM and 1–9RSM are closed. The opening of contact 1–1RSM prevents energization of coil 1FSM. The closing of contact 1–2RSM maintains coil 1RSM energized even though contact 1–2LS opens as bridge 47 starts toward its home position. The closing of contact 1–4RSM results in energization of coil 6CR thereby closing contacts 6–3CR and 6–4CR. With these contacts closed and contact 1–9RSM closed, current now flows through winding GF, resistor 2Re and variable rheostat 1VR so that generator DCG provides the higher voltage. With contacts 1–7RSM and 1–8RSM now closed, current flows through armature 48A, in the opposite direction to its previous flow and flows through winding 48SF. Thus motor 48 drives bridge 47 in the reverse direction at fast speed.

The bridge 47 trips switch 15LS to close it. The switch 14LS is already closed. The contact 1–6RSM is closed. Thus coil 8CR and solenoid 4SV are energized. The contact 8–1CR closes to maintain coil 8CR and solenoid 4SV energized after switch 15LS opens when bridge 47 passes it.

The solenoid 4SV is part of a solenoid-operated springbiased, 4-way valve (not shown) which has its spool moved from a first position to a second position when solenoid 4SV is energized. The valve is connected by hoses (not shown) to air cylinder 317 so that pressurized air is fed to one chamber and air is exhausted from the other chamber whereby piston rod 319 is extended. This results in rotation of square shaft 170 on bridge 47 in counterclockwise direction as viewed from the left-hand end of FIG. 5. This results in the lowering of arm 309 of each of cutter assemblies 49 on bridge 47. Thus cutter wheels 263 are lowered into scoring position on sheet G as bridge 47 is moving at fast speed toward its home position. When bridge 47 later is near its home position, cam 316 trips and opens switch 14LS thereby deenergizing solenoid 4SV. Then the spring moves the spool from the second position to the first position whereby piston rod 319 is retracted. This rotates square shaft 170 on bridge 47 in the opposite direction to lift cutter wheels 263. Of course, when switch 14LS is tripped open by cam 316, coil 8CR is also deenergized whereby contact 8–1CR in its holding circuit opens.

Before bridge 47 reaches its home position, it trips switch 11LS to open contact 11–1LS and close contact 11–2LS. The opening of contact 11–1LS deenergizes coil 6CR to close contact 6–1CR. Contact 1–5RSM is closed. Thus the closing of contacts 11–2LS and contact 6–1CR results in the energization of coil 7CR. The contact 7–1CR opens. The contacts 7–2CR and 7–3CR close. The contacts 6–3CR and 6–4CR open when coil 6CR is deenergized. Thus current now flows through winding GF, resistor 2Re, variable rheostat 2VR and resistor 1Re, so that generator DCG provides the lower voltage to armature 48A and winding 48SF. As a result, motor 48 now drives bridge 47 towards its home position at slow speed.

The bridge 47 at its home position trips and closes switch 7LS to energize coils 3CR and 4TCR. As a result, contact 3–1CR opens to deenergize coil 1RSM and contacts 3–2CR, 3–3CR, 3–4CR and 3–5CR close. The deenergization of coil 1RSM results in the opening of contact 1–2RSM in its holding circuit.

In the circuit containing coil 1FCM, contacts 1–2RCM, 2–1RCM and 5–1CR are closed because coils 1RCM, 2RCM and 5CR are not energized. As mentioned earlier, coil 2RCM was initially energized because contacts 3–5CR and 4–1TCR were closed. When bridge 47 left its home position switch 7LS opened whereby contacts 3–5CR and 4–1TCR opened. However, when this occurred, contact 1–4FSM closed so that coil 2RCM remained energized through the closing of contact 1–4FSM. The energization continued when coil 1FSM was deenergized because contact 1–3RSM then closed. When coil 1RSM is deenergized, as described above, contact 1–3RSM opened resulting in the deenergization of coil 2RCM. This closed contact 2–1RCM. The coil 2CR is still energized through its holding circuit containing contact 2–4CR. Thus contact 2–2CR is closed. The contact 3–4CR is closed, as mentioned above. Because coil 1FSM is now deenergized, contact 1–3FSM is closed. Thus all contacts in series with coil 1FCM are closed. The coil 1FCM is now energized thereby closing contact 1–1FCM so that current now flows through that contact and closed contact 3–3CR to energize coil 2RSM.

Because coil 2RSM is energized, contact 2–1RSM in series with coil 1FSM is open to prevent energization of that coil. The contacts 2–2RSM and 2–3RSM are open. Because coil 1RSM is deenergized, contacts 1–7RSM and 1–8RSM are open. Thus no current can flow from generator DCG through armature 48A and winding 48SF. However, contacts 2–4RSM and 2–5RSM are closed so that D.C. current is fed to armature 48A to provide the torque by which bridge 47 is maintained at its home position against the stop members.

Although contact 1–9RSM opens, contact 1–6FCM in series with winding GF closes. The energization of coil 1FCM also closed contacts 1–3FCM and 1–4FCM. The contact 12–1LS is closed and contact 12–2LS is open. This results in energization of coil 6CR and coil 7CR remains deenergized. The contacts 6–3CR and 6–4CR close so that current flows through winding GF, resistor 2Re and variable rheostat 1VR. The generator DCG thus provides the higher voltage to the armature of motor 46. The contacts in the relay for coil 1FCM are closed to provide a flow of current through the armature in the proper direction. Of course, this current also flows through the series field winding of motor 46 and now closed contacts in the relay for coil 2RCM.

At the time that coils 3CR and 4TCR are energized by the closing of switch 7LS when bridge 47 reaches its home position, contact 3–4CR closes to energize coil 1FCM, as mentioned above, and contact 3–5CR closes in the circuit containing coil 1RCM. However, contact 4–1TCR in this circuit does not close until after a delay. If contact 4–1TCR were of the instantaneous type, coil 1RCM might be energized simultaneously with or before coil 1FCM. During the delay of closing of contact 4–1TCR contact 1–2FCM opens, so that when contact 4–1TCR closes energization of coil 1RCM cannot occur.

As described earlier, square shaft 170 on bridge 45 is rotated by cam follower 50 riding up on latching cam 52 after a scoring operation whereby arm 172 is held in position by arm 53 so that cutter wheels 263 are spaced above sheet G during the return travel of bridge 45. Of course, just before bridge 45 reaches its home position, arm 53 is pivoted to release actuating arm 172 so that cam follower 50 is lowered onto cam 51. In an alternative embodiment the cams 52 and 195 can be eliminated along with latch arm 53 and its cam follower 173. Instead an air cylinder (not shown) can be mounted on bridge 45 with its piston rod connected by a crank arm to square shaft 170 so that the operation of the air cylinder can rotate shaft 170 in one direction when bridge 45 has completed its forward travel in order to raise cutter wheels 263 above their scoring position. The air cylinder will then maintain the cutter wheels 263 in this raised position during the return travel of bridge 45. The air cylinder is operated to rotate shaft 170 in the opposite direction when travel of bridge 45 from its home position begins with the energization of coils 1FCM and 6CR because contacts 1–5FCM and 6–2CR close to energize solenoid 2SV of a solenoid-operated, spring-biased, 4-way valve (not shown). The solenoid 2SV moves the spool of the valve from a first position to a second position whereby air is fed to and exhausted from this air cylinder to rotate shaft 170 so as to lower cam follower 50 onto cam 51. With this construction the inclined cam surface 176 of cam 51 is utilized to further lower cutter assemblies 49 to bring cutter wheels 263 into scoring position onto glass sheet G.

This modification is not shown in the drawings except by the circuit containing solenoid 2SV. In connection with the modified apparatus as thus described this air cylinder is operated to raise cutter wheels 263 when solenoid 2SV is deenergized whereby the spring of the valve moves the spool of the valve from the second position to the first position. The solenoid 2SV is deenergized when coil 6CR is deenergized to open contact 6–2CR. This occurs after bridge 45 has moved cutter wheels 263 across sheet G in the scoring position.

With regard to coil 8CR and solenoid 4SV, reference has been made to the energization of solenoid 4SV to lower cutter wheels 263 on bridge 47. Of course, a cam, like cam 51, with an inclined portion, like inclined cam portion 176 can be mounted on channel iron 104 and square shaft 170 on bridge 47 can be provided with an actuating arm on its end. Then the cam follower on this actuating arm would ride on the cam and down the inclined cam portion during the travel of bridge 47 from left to right. This would occur after solenoid 4SV is energized. Of course, this modification of bridge 47 would not include a latch arm, similar to latch arm 53 with its cam follower 173, and would not include on channel iron 104 cams such as cams 52 and 195.

When bridge 45 moves at high speed sufficiently far from its home position, cam 313 trips switch 12LS to open contact 12–1LS and close contact 12–2LS. This deenergizes coil 6CR and energizes coil 7CR so that contacts 6–3CR and 6–4CR open and contacts 7–2CR and 7–3CR close. The flow of current then is through rheostat 2VR instead of 1VR whereby generator DCG provides a lower voltage to the armature and series field of motor 46. The bridge 45 is then driven by motor 46 in the forward position at slow speed.

When switch 9LS is tripped closed by cam 313 on bridge 45 moving forwardly at slow speed, coil 5CR is energized to open contacts 5–1CR and 5–2CR. This results in the deenergization of coil 1FCM and 2CR. Upon the deenergization of coil 1FCM contact 1–2FCM closes. The contacts 4–2CR and 4–3CR closed and opened, respectively, when coil 4CR was deenergized after bridge 45 moved from its home position so that switch 8LS opened. As mentioned above, coils 3CR and 4TCR are energized when bridge 47 returned to its home position. Contact 3–5CR immediately and after a delay contact 4–1TCR closed. Thus all contacts in series with coil 1RCM except contact 1–2FCM are closed before cam 313 trips switch 9LS. The closing of contact 1–2FCM thus energizes coil 1RCM. This opens contact 1–2RCM in the circuit for coil 1FCM.

Although contact 1–1FCM opens when coil 1FCM is deenergized, the energization of coil 2RSM is continued through the circuit containing contacts 3–2CR, 3–3CR and 1–1RCM, because coil 3CR is already energized and coil 1RCM is now energized to close contact 1–1RCM. The energization of coil 1RCM also closes contacts 1–3RCM, 1–4RCM, 1–5RCM and 1–6RCM, as well as contacts in a circuit with the armature for motor 46 in the same manner as shown for contacts 1–7RSM and 1–8RSM in the circuit with armature 48A. This changes the direction of flow of current through this armature.

Because contact 13–1LS is closed and contact 13–2LS is open and because contact 1–3RCM is now closed, coil 6CR is energized and coil 7CR is not energized. Thus through closed contacts 6–3CR and 6–4CR current flows through rheostat 1VR because contact 1–5RCM is closed. Accordingly, bridge 45 is now driven in the reverse direction at fast speed.

When coil 1RCM is energized, contact 1–5RCM closes to energize solenoid 3SV of a solenoid-operated, spring-biased, 4-way valve (not shown) which connects a pressurized air source and an exhaust to air cylinders 213.

When solenoid 3SV is not energized, the spring of the valve has its spool at a first position whereby the pressurized air is fed to hose 215 and hose 214 is communicating with the exhaust outlet of the valve. As a result, air cylinder 213 has piston rod 218 in the raised position so that each wheel 75 is in the raised position as shown in FIG. 15. When solenoid 3SV is energized, the spool is moved to the other position so that hose 214 communicates with the pressurized air source and hose 215 communicates with the exhaust outlet of the valve. As a result, each air cylinder 213 lowers the associated wheel 75 onto glass sheet G. Accordingly, as bridge 45 moves in reverse direction at fast speed wheels 75 provide a downward force on the trailing and leading margins of sheet G. It is recalled that bars 76 and 77 are under sheet G and belt 44 adjacent to the first score lines but on the opposite sides of the score lines from wheels 75. Thus wheels 75 provide a running of the cuts along these score lines.

When bridge 45 approaches its home position, cam 315 trips switch 13LS to open contact 13–1LS and to close contact 13–2LS for the deenergization and energization of coils 6CR and 7CR, respectively. This results in the opening of contacts 6–3CR and 6–4CR and the closing of contacts 7–2CR and 7–3CR so that current flowing through winding GF now flows through rheostat 2VR whereby the armature of motor 46 is provided with the lower voltage by generator DCG. The motor 46 then operates at slow speed until bridge 45 trips and closes switch 8LS to energize coil 4CR thereby opening contact 4–2CR and closing contact 4–3CR. As a result, coil 1RCM is deenergized and coil 2RCM is energized.

Upon the deenergization of coil 1RCM, contact 1–2CRM closes without an effect, contact 1–2RCM opens to deenergize coil 2RSM and contacts 1–3RCM and 1–4RCM open.

The opening of contact 1–4RCM deenergizes coil 7CR so that contact 7–2CR and 7–3CR open, whereby current no longer flows through winding GF. Of course, this also happens because contact 1–6RCM opens. Also the contacts of the coil, corresponding to contacts 1–7RSM and 1–8RSM, in the circuit for the armature of motor 46 open. Thus current no longer flows through the series field winding of motor 46 that corresponds to winding 48SF of motor 48. However, the energization of coil 2RCM results in the closing of contacts, that correspond to contacts 2–4RSM and 2–5RSM in the circuit that connects the D.C. source to armature 48A, so that direct current is fed to the armature of motor 46. Thus a torque is provided to motor 46 that is sufficient to hold bridge 45 in its home position against the stop members.

Just before bridge 45 arrives at its home position cam 315 trips and closes switch 2LS in series with now closed contacts 2–3CR and 1–1BCBC and coil BCM. Thus the closing of switch 2LS results in the energization of coil BCM to start the motor that drives belt 44. The scored glass sheet G is thus moved from apparatus 25 onto conveyor 31. The switch 2LS remains closed by cam 315 when bridge 45 is at its home position.

During the deenergization of coil BCM, coil 1TCR was deenergized because contact 1–1BCBC was open. Thus the contact of the relay having coil 1TCR is open in its circuit so that conveyor 30 cannot operate to feed another sheet G to apparatus 25. When coil BCM is energized again, contact 1–1BCM closes to energize 1TCR. After its delay the contact of the relay having coil 1TCR closes to restart the operation of conveyor 30. This delay is for the purpose of preventing a feeding of a new glass sheet G onto belt 44 until the scored glass sheet G has been at least partially removed from cutting apparatus 25 by belt 44 which is moving again.

It is seen from the foregoing description that coil 2RCM is energized during the forward and reverse travel of bridge 47. This energization of coil 2RCM insures that bridge 45 is properly positioned because the armature of motor 46 is provided with a torque by a D.C. source through contacts that are closed by the energization of coil 2RCM. Similarly, during the forward and reverse drive of bridge 45 the coil 2RSM is energized so that through lines L9 and L10 and contacts 2–4RSM and 2–5RSM direct current is provided to armature 48A to maintain bridge 47 at its home position. Thus during the forward or reverse travel of either of bridges 45 and 47 the flat rail mounted on the other bridge is properly positioned to provide support.

The foregoing description completes one cycle of operation. Another cycle is initiated when the next glass sheet G trips and closes switches 3LS through 5LS.

When bridge 45 is away from its home position during its cycle of operation, coil 4CR cannot be energized except through the closing of switch 1PB. When switch 1PB is momentarily closed for the energization of coil 4CR, contact 4–3CR closes to energize coil 2RCM thereby opening contact 2–1RCM in series with coil 1FCM. If this is done when bridge 47 is being driven forwardly, the forward drive stops. When switch 1PB is opened, coil 4CR is deenergized thereby closing contact 4–2CR to energize coil 1RCM. This results in the reverse drive of bridge 45. Although contact 2–1RCM closes because contact 4–3CR opens to deenergize coil 2RCM, coil 1FCM cannot be energized because contact 1–2RCM opens. The reverse drive continues first at fast speed and then at slow speed until switch 8LS is closed to energize coil 4CR, as described earlier in connection with the complete cycle of operation.

In the foregoing description of the apparatus of the invention, cutter assemblies 49 have been referred to as being mounted on movable bridges 45 and 47 which are carriages. They are provided with rolling support by rollers 131 and 133 journalled on bridges 45 and 47. The rollers 131 and 133 are wheels in effect. The wheels 133 ride on flat rail supports whereas wheels 131 ride on guide rail supports. It will be apparent to one skilled in the art that wheels or rollers 133 could be on both sides of carriages 45 and 47. In this construction flat rail supports would be used throughout. A guide for each of bridges 45 and 47 would be required for each carriage. Many modifications to accomplish this would be apparent to one skilled in the art. For example, each of the bridges could rotatably support cam followers that would ride in guides mounted on the supporting structure and these cam followers would merely function as guides. They would not be positioned to provide the additional function of supporting the bridges. The followers 131 in cooperation with the guide rails in the preferred embodiment provide both functions.

In the illustrative embodiment the cutter assemblies merely provide a scoring action. In place of these cutter assemblies 49 one can utilize cutter assemblies that provide ultrasonic cutting. This type of cutter assembly and the process using it are described and claimed in copending application Serial No. 611,707, filed on September 24, 1956, by Florian V. Atkeson, and entitled "Apparatus and Method of Cutting Glass." As described in that application, with a proper choice of conditions and type of cutter wheel one can produce score line that automatically runs through the glass to provide separate glass sheets. Thus with this type of cutter assembly it is not necessary to run the cuts in either direction by a snapping apparatus.

Various modifications of the apparatus will be apparent to one skilled in the art from the description of the preferred embodiment presented above and in the drawings. Thus the invention is not to be limited by this description but only the claims that follow.

I claim:

1. An apparatus for cutting a glass sheet along a set of parallel lines and along another set of parallel lines which are normal to the first set of parallel lines which comprises a supporting structure, means to support horizontally the sheet at a cutting station, a first carriage having first and second sets of wheels, a second carriage having first and second sets of wheels, first, second, third and fourth horizontal rail supports mounted on the supporting structure, a fifth horizontal rail support mounted on said first carriage, a sixth horizontal rail support mounted on said second carriage, said first, second and sixth rail supports extending in a direction normal to the direction in which said third, fourth and fifth rail supports extend, first power means to move said first carriage between first and second positions, second power means to move said second carriage between first and second positions, said first set of wheels of said first carriage being supported by said first rail support, said second set of wheels of said first carriage being supported by said second rail support with said first carriage at the first position and by said sixth rail support during movement of said first carriage from said first position to said second position, said first set of wheels of said second carriage being supported by said third rail support, said second set of wheels of said second carriage being supported by said fourth rail support with said second carriage at the first position and by said fifth rail support during movement of said second carriage from the first position to the second position, glass cutter wheels mounted on said first carriage to provide score lines on the sheet in the direction of travel of said first carriage, glass cutter wheels mounted on said second carriage to provide score lines on the sheet in the direction of travel of said second carriage, means to guide said first carriage in a rectilinear path during movement between the first and second positions and means to guide said second carriage in a rectilinear path during movement between the first and second positions.

2. The apparatus of claim 1 including means to convey the glass sheet to said support means and means to remove the sheet from said support means.

3. The apparatus of claim 1 wherein the first and third rail supports are guide rail supports and wherein the first set of wheels of said first and second carriages are constructed and arranged to cooperate with said first and third guide rail supports to provide said guide means for said first and second carriages.

4. The apparatus of claim 3 wherein the means to move said first carriage between first and second positions includes first and second gears mounted on said first carriage for rotation about parallel horizontal axes, a motor mounted on said first carriage to rotate said first and second gears and first, second and third racks, said first gear engaging said first rack mounted on the supporting structure during movement of said first carriage, said second gear engaging said second rack mounted on said supporting structure at the first position and engaging said third rack supported by said second carriage during movement of said first carriage from the first position to the second position and said means to move said second carriage between first and second positions includes third and fourth gears mounted on said second carriage for rotation about parallel horizontal axes, a motor mounted on said second carriage to rotate said third and fourth gears and fourth, fifth and sixth racks, said third gear engaging said fourth rack mounted on the supporting structure during movement of said second carriage, said fourth gear engaging said fifth rack mounted on said supporting structure at the first position and engaging said sixth rack supported by said first carriage during movement of said second carriage from the first position to the second position.

5. The apparatus of claim 1 wherein said second and sixth rail supports are at a different elevation than that of said fourth and fifth rail supports, wherein said second and sixth rail supports are at the same elevation and wherein said fourth and fifth rail supports are at the same elevation.

6. The apparatus of claim 1 including means to maintain said second carriage at the first position during movement of said first carriage between the first and second positions and means to maintain said first carriage at the first position during movement of said second carriage between the first and second positions.

7. The apparatus of claim 1 including means to provide said cutter wheels on said first carriage at a lowered position for scoring during movement of said carriage from the second position to the first position and means to provide said cutter wheels at a raised position during movement of said first carriage from the first position to the second position, means to provide said cutter wheels on said second carriage at a lowered position for scoring during movement of said second carriage from the first position to the second position and means to provide said cutter wheels on said second carriage at a raised position during movement of said second carriage from the second position to the first position.

8. An apparatus for cutting a glass sheet which comprises a supporting structure, a table, belt conveyor means including a belt with a top run on said table and motor means to drive said belt, whereby said belt conveyor means moves the sheet to and from a cutting station on said belt above said table, conveyor means to feed the sheet to said belt conveyor means, conveyor means to receive the glass sheet from said belt conveyor means, a first carriage having first and second sets of wheels, a second carriage having first and second sets of wheels, first, second, third, and fourth horizontal rail supports mounted on the supporting structure, a fifth horizontal rail support mounted on said first carriage, a sixth horizontal rail support mounted on said second carriage, said first, second and sixth rail supports extending in a direction normal to the direction in which said third, fourth and fifth rail supports extend, first power means to move said first carriage between first and second positions, second power means to move said second carriage between first and second positions, said first set of wheels of said first carriage being supported by said first rail support, said second set of wheels of said first carriage being supported by said second rail support with said first carriage at the first position and by said sixth rail support during movement of said first carriage from said first position to said second position, said first set of wheels of said second carriage being supported by said third rail support, said second set of wheels of said second carriage being supported by said fourth rail support with said second carriage at the first position and by said fifth rail support during movement of said second carriage from the first position to the second position, glass cutter wheels mounted on said first carriage to provide score lines on the sheet in the direction of travel of said first carriage, glass cutter wheels mounted on said second carriage to provide score lines on the sheet in the direction of travel of said second carriage, means to guide said first carriage in a rectilinear path during movement between the first and second positions, means to guide said second carriage in a rectilinear path during movement between the first and second positions, means to maintain said second carriage at the first position during movement of said first carriage between the first and second positions and means to maintain said first carriage at the first position during movement of said second carriage between the first and second positions.

9. The apparatus of claim 8 including means responsive to passage of the trailing edge of the sheet being moved by one of said belt conveyor means and said feeding conveyor means to the cutting station, said responsive means being constructed to stop after a delay said motor means for driving said belt whereby one of the leading and trailing edges of the sheet is indexed at the cutting station.

10. The apparatus of claim 8 including means to provide said cutter wheels on said first carriage at a lowered position for scoring during movement of said carriage from the second position to the first position and means to provide said cutter wheels at a raised position during movement of said first carriage from the first position to the second position, means to provide said cutter wheels on said second carriage at a lowered position for scoring during movement of said second carriage from the first position to the second position and means to provide said cutter wheels on said second carriage at a raised position during movement of said second carriage from the second position to the first position.

11. The apparatus of claim 10 wherein means to provide said cutter wheels on one of said carriages at a lowered position and at a raised position includes cam means having cams mounted on the supporting structure and cam follower means mounted on said one carriage and operatively connected to said cutter wheels on said one carriage for raising and lowering said cutter wheels.

12. The apparatus of claim 11 wherein each of said cutter wheels is a component of a cutter assembly including a support plate, a guide housing, a plunger having a hole in its upper portion, said guide housing and plunger being constructed to provide vertical movement only of said plunger between lowered and raised positions, said cutter wheel being mounted on the bottom part of said plunger for rotation about a horizontal axis, a lifting arm having a roller mounted on its free end and extending into said hole for raising said plunger by pivotal movement of said lifting arm, a block mounted on the top part of said plunger and having a downwardly facing cam surface, a retaining arm having a roller journaled at one end, means for pivotally mounting said retaining arm on the support plate for movement between a first position in which said retaining roller is in a vertical plane other than one through said block and a second position in which said retaining roller is below said block, means urging said retaining arm toward the second position and means to restrain said retaining arm in the first position and wherein said cam follower means includes a shaft journaled on said one carriage, an actuating arm fixed on said shaft and a cam follower mounted on said actuating arm for engagement with one of said cams, said lifting arm being mounted on said shaft for pivotal movement upon rotation of said shaft.

13. The apparatus of claim 8 including an actuated power-operated positioning mechanism including pusher plates mounted on the supporting structure for horizontal movement between first and second positions with said movement being parallel to the direction of movement of one of said carriages and means responsive to stopping of said motor means of said belt conveyor means to actuate said positioning mechanism whereby one of the edges of the sheet other than the trailing and leading edges is pushed by said plates for alignment normal to the direction of movement of said plates and parallel to the direction of movement of said belt at the top run.

14. The apparatus of claim 8 including first actuating means responsive to the leading edge of the sheet moving on one of said feeding and belt conveyor means, second actuating means responsive to stopping of operation of said motor means of said belt conveyor means, third actuating means responsive to return of said first carriage to the first position and fourth actuating means responsive to movement of said second carriage toward the first position after scoring by said cutter wheels on said second carriage, wherein said first power means to move said first carriage includes a first motor mounted on said first carriage, means to operate said first motor forwardly at fast speed and then at slow speed in response first to said first actuating means and means to operate said first motor in reverse in response first to said second actuating means at fast speed and then at slow speed during travel to the first position of said first carriage and finally at a low torque at the first position of said first carriage, and wherein said second power means to move said second carriage includes a second motor mounted on said second carriage, means to operate said second motor forwardly at fast speed and then at slow speed in response first to said third actuating means, and then to operate said second motor in reverse at fast speed and at slow speed during travel from the second position to the first position of said second carriage and finally at low torque at the first position of said second carriage, and wherein said motor means of said belt conveyor means initiates operation to drive said belt in response to said fourth actuating means.

15. The apparatus of claim 13 wherein said apparatus includes snapping wheels rotatably mounted on said second carriage for movement between a raised position and a lowered position, means to raise said snapping wheels and to maintain said snapping wheels in raised position during movement of said second carriage from the first position to the second position, means to lower said snapping wheels to be in lowered position during movement of said second carriage from the second position to the first position, said snapping wheels being positioned to ride on and to create a downward force on the glass sheet at the trailing and leading margins during movement of said second carriage from the second position to the first position, and bars extending transversely under said belt adjacent the path of travel of said snapping wheels and positioned adjacent and between said snapping wheels whereby said bars and said snapping wheels when moving in the lowered position cooperate to run cuts along score lines adjacent the leading and trailing edges of said sheet.

16. The apparatus of claim 8 wherein said apparatus includes snapping wheels rotatably mounted on said second carriage for movement between a raised position and a lowered position, means to raise said snapping wheels and to maintain said snapping wheels in raised position during movement of said second carriage from the first position to the second position, means to lower said snapping wheels to be in lowered position during movement of said second carriage from the second position to the first position, said snapping wheels being positioned to ride on and to create a downward force on the glass sheet at the trailing and leading margins during movement of said second carriage from the second position to the first position, and bars extending transversely under said belt adjacent the path of travel of said snapping wheels and positioned adjacent and between said snapping wheels whereby said bars and said snapping wheels when moving in the lowered position cooperate to run cuts along score lines adjacent the leading and trailing edges of said sheet.

17. An apparatus for cutting a glass sheet which comprises a cutting station including means to support the glass sheet, a pair of carriages supported at first and second opposite ends and adapted to traverse said cutting station in rectilinear paths substantially at right angles to each other, fixed means to support said first ends of each carriage along said paths, means on each one of said carriages to support the second end of the other carriage as each carriage traverses the cutting station, and means, including glass cutter wheels, mounted on each carriage to score the glass sheet.

18. The apparatus of claim 17 including means to run cuts along score lines adjacent two edges of said sheet, said means including snapping wheels mounted on one of said carriages for movement along tthe path of travel of said carriage and bars beneath said sheet at said cutting station adjacent the path of travel of said wheels and positioned between said wheels.

References Cited in the file of this patent

UNITED STATES PATENTS

| | | |
|---|---|---|
| 1,920,591 | Pesci | Aug. 1, 1933 |
| 1,946,356 | Owen | Feb. 6, 1934 |
| 2,103,875 | Shock | Dec. 28, 1937 |
| 2,705,389 | Wyman | Apr. 5, 1955 |
| 2,711,617 | Trammell | June 28, 1955 |
| 2,793,471 | Kurata et al. | May 28, 1957 |
| 2,948,991 | Walters et al. | Aug. 16, 1960 |

FOREIGN PATENTS

| | | |
|---|---|---|
| 290,241 | Great Britain | Dec. 6, 1928 |